US012750707B2

(12) United States Patent
Sakhnini et al.

(10) Patent No.: US 12,750,707 B2
(45) Date of Patent: Sep. 29, 2026

(54) MIXED DOWNLINK REFERENCE SIGNAL AND FEEDBACK INFORMATION REPORTING

(71) Applicant: QUALCOMM Incorporated, San Diego, CA (US)

(72) Inventors: Iyab Issam Sakhnini, San Diego, CA (US); Tao Luo, San Diego, CA (US); Yan Zhou, San Diego, CA (US)

(73) Assignee: QUALCOMM Incorproated, San Diego, CA (US)

( * ) Notice: Subject to any disclaimer, the term of this patent is extended or adjusted under 35 U.S.C. 154(b) by 708 days.

(21) Appl. No.: 17/930,311

(22) Filed: Sep. 7, 2022

(65) Prior Publication Data

US 2024/0080693 A1 Mar. 7, 2024

(51) Int. Cl.
*H04W 24/10* (2009.01)
*H04L 1/1812* (2023.01)
*H04L 5/00* (2006.01)

(52) U.S. Cl.
CPC ........... *H04W 24/10* (2013.01); *H04L 1/1812* (2013.01); *H04L 5/005* (2013.01)

(58) Field of Classification Search
None
See application file for complete search history.

(56) References Cited

U.S. PATENT DOCUMENTS 11,856,432 B2 * 12/2023 Bai ........................ H04B 7/088
2019/0165896 A1 * 5/2019 Huang .................. H04L 1/1664
2019/0319739 A1 * 10/2019 Kang ................ H04W 72/0446
2021/0014898 A1 * 1/2021 Lei .................... H04W 74/0833
2021/0051600 A1 * 2/2021 Fakoorian ........... H04W 52/245
2022/0095145 A1 3/2022 Sakhnini et al.
2022/0095254 A1 3/2022 Zhu et al.
2022/0149924 A1 5/2022 Zhang et al.
2023/0291442 A1 * 9/2023 Davoli ................. H04B 7/0632
2024/0089778 A1 * 3/2024 Fan ....................... H04W 24/08

OTHER PUBLICATIONS

International Search Report and Written Opinion—PCT/US2023/073523—ISA/EPO—Dec. 18, 2023.
Mediatek Inc: "Discussion on V2X Physical Layer Procedure", 3GPP TSG RAN WG1 #97, R1-1906558, V2X_Physical_layer_procedure, 3rd Generation Partnership Project, Mobile Competence Centre, 650, Route Des Lucioles, F-06921 Sophia-Antipolis Cedex, France, vol. RAN WG1, No. Reno, USA, May 13, 2019-May 17, 2019, May 4, 2019, 9 Pages, XP051708594, p. 3-p. 7 figures 3, 4 section 3.

* cited by examiner

*Primary Examiner* — Luna Weissberger
(74) *Attorney, Agent, or Firm* — Polsinelli

(57) ABSTRACT

Systems and techniques are provided for wireless communications. For example, a first network node (e.g., a user equipment (UE) or other network node) may receive a reference signal and cause uplink information to be transmitted to a second network node (e.g., a base station, such as a gNodeB (gNB)). The uplink information is indicative of first measurement information associated with the reference signal and feedback information associated with a transmission.

25 Claims, 14 Drawing Sheets

1050

| | RS ID (1060) | Measurement (1070) | HARQ ACK/NACK (1080) |
|---|---|---|---|
| Beam 0 (DMRS) | DMRSRI | Meas (Abs/Highest) | N-bits |
| Beam 1 (DMRS) | DMRSRI | Meas (Diff) | N-bits |
| Beam 2 (CSI-RS) | CRI | Meas (Diff) | N/A |
| Beam 3 (CSI-RS) | CRI | Meas (Diff) | N/A |

FIG. 10

1150

| | RS ID (1160) | Measurement (1170) | HARQ ACK/NACK *(implicit)* (1180) |
|---|---|---|---|
| Beam 0 (DMRS) | DMRSRI | Meas (Abs/Highest) | ACK (1182) |
| Beam 1 (DMRS) | DMRSRI | Meas (Diff) | ACK (1184) |
| Beam 2 (CSI-RS) | CRI | Meas (Diff) | |
| Beam 3 (CSI-RS) | CRI | Meas (Diff) | |

FIG. 11

MIXED DOWNLINK REFERENCE SIGNAL AND FEEDBACK INFORMATION REPORTING

FIELD

Aspects of the present disclosure generally relate to wireless communication. In some implementations, examples are described for mixed reference signal beam management.

INTRODUCTION

Wireless communications systems are deployed to provide various telecommunication services, including telephony, video, data, messaging, broadcasts, among others. Wireless communications systems have developed through various generations, including a first-generation analog wireless phone service (1G), a second-generation (2G) digital wireless phone service (including interim 2.5G networks), a third-generation (3G) high speed data, Internet-capable wireless service, a fourth-generation (4G) service (e.g., Long-Term Evolution (LTE), WiMax), and a fifth-generation (5G) service (e.g., New Radio (NR)). There are presently many different types of wireless communications systems in use, including cellular and personal communications service (PCS) systems. Examples of known cellular systems include the cellular Analog Advanced Mobile Phone System (AMPS), and digital cellular systems based on code division multiple access (CDMA), frequency division multiple access (FDMA), time division multiple access (TDMA), the Global System for Mobile communication (GSM), etc.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

Disclosed are systems, methods, apparatuses, and computer-readable media for performing wireless communication. According to at least one example, a first network node for wireless communication is provided. The first network node includes at least one memory and at least one processor coupled to the at least one memory. The at least one processor is configured to: receive a reference signal; and cause uplink information to be transmitted to a second network node, wherein the uplink information is indicative of: first measurement information associated with the reference signal; and feedback information associated with a transmission. In one illustrative example, the first network node may include a user equipment (UE) and the second network node may include a base station (e.g., a gNodeB (gNB) or other base station, or a portion of the base station, such as a central unit (CU), a distributed unit (DU), a radio unit (RU), a Near-Real Time (Near-RT) RAN Intelligent Controller (RIC), or a Non-Real Time (Non-RT) RIC of a base station having a disaggregated architecture).

In another example, a method for wireless communication at a first network node is provided. The method includes: receiving a reference signal; and transmitting uplink information to a second network node, wherein the uplink information is indicative of: first measurement information associated with the reference signal; and feedback information associated with a transmission.

In another example, a non-transitory computer-readable medium is provided having instructions thereon that, when executed by one or more processors, cause the one or more processors to: receive a reference signal; and cause uplink information to be transmitted to a second network node, wherein the uplink information is indicative of: first measurement information associated with the reference signal; and feedback information associated with a transmission.

In another example, an apparatus for wireless communication is provided. The apparatus includes: means for receiving a reference signal; and means for transmitting uplink information to a second network node, wherein the uplink information is indicative of: first measurement information associated with the reference signal; and feedback information associated with a transmission.

According to at least one other example, a first network node for wireless communication is provided. The first network node includes at least one memory and at least one processor coupled to the at least one memory. The at least one processor is configured to: receive a plurality of reference signals, wherein the plurality of reference signals includes a first reference signal of a first type and a second reference signal of a second type different from the first type; and cause uplink information to be transmitted to a second network node, wherein the uplink information is indicative of: first measurement information associated with the first reference signal of the first type; second measurement information associated with the second reference signal of the second type; and feedback information associated with a transmission. In one illustrative example, the first network node may include a user equipment (UE) and the second network node may include a base station (e.g., a gNB or other base station, or a portion of the base station, such as a CU, a DU, a RU, a Near-RT RIC, or a Non-RT RIC of a base station having a disaggregated architecture).

In another example, a method for wireless communication at a first network node is provided. The method includes: receiving a plurality of reference signals, wherein the plurality of reference signals includes a first reference signal of a first type and a second reference signal of a second type different from the first type; and transmitting uplink information to a second network node, wherein the uplink information is indicative of: first measurement information associated with the first reference signal of the first type; second measurement information associated with the second reference signal of the second type; and feedback information associated with a transmission.

In another example, a non-transitory computer-readable medium is provided having instructions thereon that, when executed by one or more processors, cause the one or more processors to: receive a plurality of reference signals, wherein the plurality of reference signals includes a first reference signal of a first type and a second reference signal of a second type different from the first type; and cause uplink information to be transmitted to a second network node, wherein the uplink information is indicative of: first measurement information associated with the first reference signal of the first type; second measurement information associated with the second reference signal of the second type; and feedback information associated with a transmission.

In another example, an apparatus for wireless communication is provided. The apparatus includes: means for receiving a plurality of reference signals, wherein the plurality of reference signals includes a first reference signal of a first type and a second reference signal of a second type different from the first type; and means for transmitting uplink information to a second network node, wherein the uplink information is indicative of: first measurement information associated with the first reference signal of the first type; second measurement information associated with the second reference signal of the second type; and feedback information associated with a transmission.

According to at least one other example, a first network node for wireless communication is provided. The first network node includes at least one memory and at least one processor coupled to the at least one memory. The at least one processor is configured to: cause a reference signal to be transmitted to a second network node; and receive uplink information from the second network node, wherein the uplink information is indicative of: first measurement information associated with the reference signal; and feedback information associated with a transmission. In one illustrative example, the first network node may include a base station (e.g., a gNB or other base station, or a portion of the base station, such as a CU, a DU, a RU, a Near-RT RIC, or a Non-RT RIC of a base station having a disaggregated architecture) and the second network node may include a user equipment (UE).

In another example, a method for wireless communication at a first network node is provided. The method includes: transmitting a reference signal to a second network node; and receiving uplink information from the second network node, wherein the uplink information is indicative of: first measurement information associated with the reference signal; and feedback information associated with a transmission.

In another example, a non-transitory computer-readable medium is provided having instructions thereon that, when executed by one or more processors, cause the one or more processors to: cause a reference signal to be transmitted to a second network node; and receive uplink information from the second network node, wherein the uplink information is indicative of: first measurement information associated with the reference signal; and feedback information associated with a transmission.

In another example, an apparatus for wireless communication is provided. The apparatus includes: means for transmitting a reference signal to a second network node; and means for receiving uplink information from the second network node, wherein the uplink information is indicative of: first measurement information associated with the reference signal; and feedback information associated with a transmission.

According to at least one other example, a first network node for wireless communication is provided. The first network node includes at least one memory and at least one processor coupled to the at least one memory. The at least one processor is configured to: cause a plurality of reference signals to be transmitted to a second network node, wherein the plurality of reference signals includes a first reference signal of a first type and a second reference signal of a second type different from the first type; and receive uplink information from the second network node, wherein the uplink information is indicative of: first measurement information associated with the first reference signal of the first type; second measurement information associated with the second reference signal of the second type; and feedback information associated with a transmission. In one illustrative example, the first network node may include a base station (e.g., a gNB or other base station, or a portion of the base station, such as a CU, a DU, a RU, a Near-RT RIC, or a Non-RT RIC of a base station having a disaggregated architecture) and the second network node may include a user equipment (UE).

In another example, a method for wireless communication at a first network node is provided. The method includes: transmitting a plurality of reference signals to a second network node, wherein the plurality of reference signals includes a first reference signal of a first type and a second reference signal of a second type different from the first type; and receiving uplink information from the second network node, wherein the uplink information is indicative of: first measurement information associated with the first reference signal of the first type; second measurement information associated with the second reference signal of the second type; and feedback information associated with a transmission.

In another example, a non-transitory computer-readable medium is provided having instructions thereon that, when executed by one or more processors, cause the one or more processors to: cause a plurality of reference signals to be transmitted to a second network node, wherein the plurality of reference signals includes a first reference signal of a first type and a second reference signal of a second type different from the first type; and receive uplink information from the second network node, wherein the uplink information is indicative of: first measurement information associated with the first reference signal of the first type; second measurement information associated with the second reference signal of the second type; and feedback information associated with a transmission.

In another example, an apparatus for wireless communication is provided. The apparatus includes: means for transmitting a plurality of reference signals to a second network node, wherein the plurality of reference signals includes a first reference signal of a first type and a second reference signal of a second type different from the first type; and means for receiving uplink information from the second network node, wherein the uplink information is indicative of: first measurement information associated with the first reference signal of the first type; second measurement information associated with the second reference signal of the second type; and feedback information associated with a transmission.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip implementations or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

Other objects and advantages associated with the aspects disclosed herein will be apparent to those skilled in the art based on the accompanying drawings and detailed description. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and aspects, will become more apparent upon referring to the following specification, claims, and accompanying drawings.

BRIEF DESCRIPTION OF THE DRAWINGS

The accompanying drawings are presented to aid in the description of various aspects of the disclosure and are provided solely for illustration of the aspects and not limitation thereof.

FIG. 10 is a diagram illustrating an example of a mixed reference signal measurement report including measurement information and feedback information, in accordance with some examples;

FIG. 11 is a diagram illustrating an example of a mixed reference signal measurement report including measurement information and implicitly signaled feedback information, in accordance with some examples;

DETAILED DESCRIPTION

Figure 1:
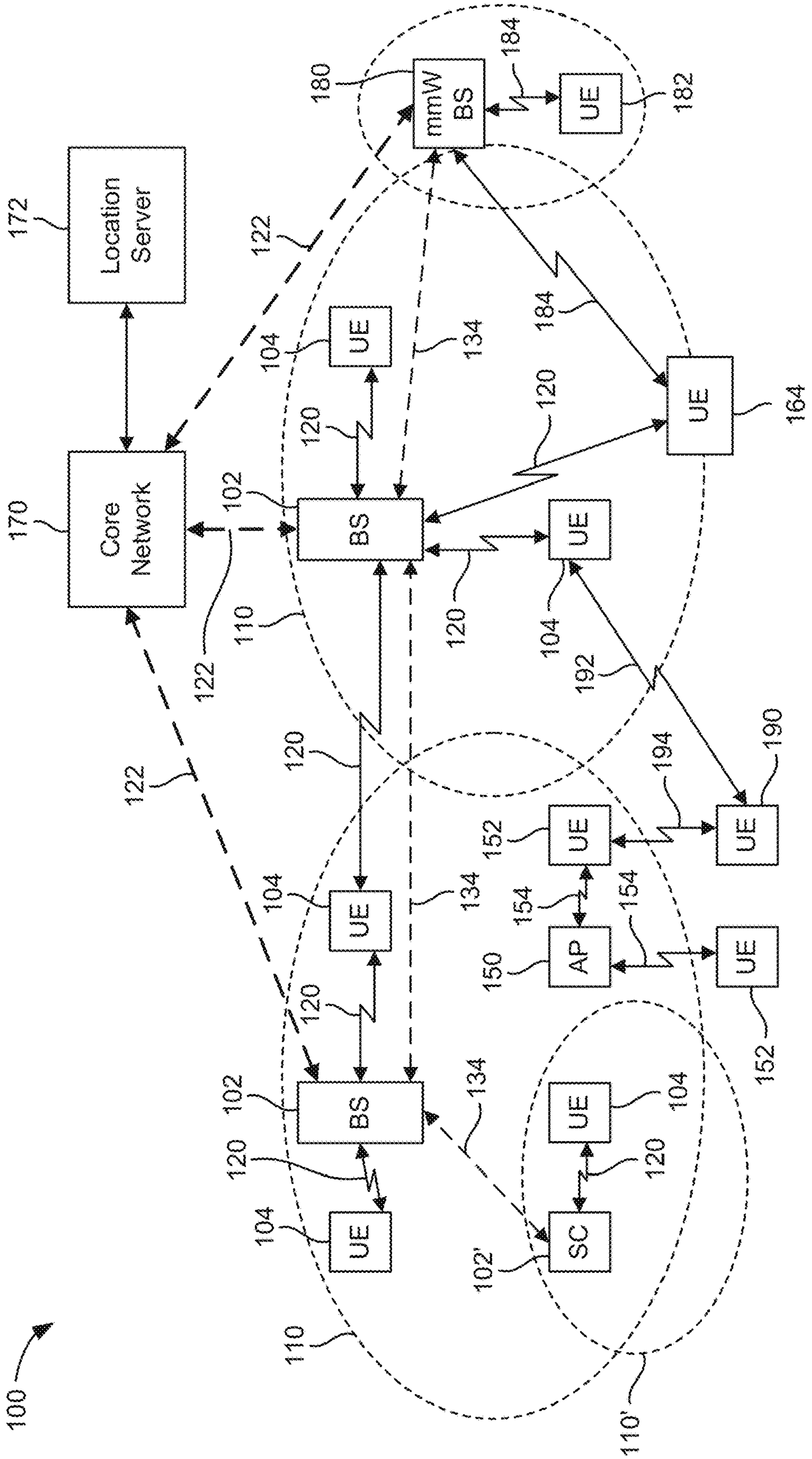
FIG. 1 is a block diagram illustrating an example of a wireless communication network, in accordance with some examples.

Certain aspects of this disclosure are provided below for illustration purposes. Alternate aspects may be devised without departing from the scope of the disclosure. Additionally, well-known elements of the disclosure will not be described in detail or will be omitted so as not to obscure the relevant details of the disclosure. Some of the aspects described herein may be applied independently and some of them may be applied in combination as would be apparent to those of skill in the art. In the following description, for the purposes of explanation, specific details are set forth in order to provide a thorough understanding of aspects of the application. However, it will be apparent that various aspects may be practiced without these specific details. The figures and description are not intended to be restrictive.

The ensuing description provides example aspects only, and is not intended to limit the scope, applicability, or configuration of the disclosure. Rather, the ensuing description of the example aspects will provide those skilled in the art with an enabling description for implementing an example aspect. It should be understood that various changes may be made in the function and arrangement of elements without departing from the scope of the application as set forth in the appended claims.

Wireless communication networks can be deployed to provide various communication services, such as voice, video, packet data, messaging, broadcast, any combination thereof, or other communication services. A wireless communication network may support both access links and sidelinks for communication between wireless devices. An access link may refer to any communication link between a client device (e.g., a user equipment (UE), a station (STA), or other client device) and a base station (e.g., a 3GPP gNB for 5G/NR, a 3GPP eNB for 4G/LTE, a Wi-Fi access point (AP), or other base station). For example, an access link may support uplink signaling, downlink signaling, connection procedures, etc. An example of an access link is a Uu link or interface (also referred to as an NR-Uu) between a 3GPP gNB and a UE.

In various wireless communication networks, reference signals are transmitted and received via beams. In some examples, a beam may be generated using beamforming. Beamforming (e.g., which may also be referred to as spatial filtering, directional transmission, and/or directional reception) is a signal processing technique that may be used at a transmitting device or a receiving device (e.g., a base station or a UE) to shape or steer an antenna beam (e.g., a transmit beam or receive beam) along a spatial path between the transmitting device and the receiving device. Beamforming can be performed based on combining signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the transmitting device or receiving device. The adjustments associated with each of the antenna elements may be defined by a beamforming weight set associated with a particular orientation (e.g., with respect to the antenna array of the transmitting device or receiving device, or with respect to some other orientation).

In some examples, a base station may use multiple antennas or antenna arrays to conduct beamforming operations for directional communications with a UE. For example, one or more signals (e.g., synchronization signals, reference signals, beam management signals, and/or other control signals) may be transmitted by a base station multiple times in different directions, which may include a signal being transmitted according to different beamforming weight sets associated with different directions of transmission. Transmissions in different beam directions may be used to identify (e.g., by the base station or a receiving device (e.g., a UE)) a beam direction for subsequent transmission and/or reception by the base station. Some signals (e.g., such as data signals associated with a particular receiving device) may be transmitted by a base station in a single beam direction (e.g., a direction associated with the receiving device or UE). In some examples, the beam direction associated with transmissions along a single beam direction may be determined based on a signal that was transmitted in different beam directions. For example, a UE may receive one or more of the signals transmitted by the base station in different directions, and the UE may report to the base station an indication of the signal that the UE received with a highest signal quality. In some cases, the UE may report to the base station an indication of multiple signals received by the UE, along with an associated signal quality with which the UE received each respective signal of the multiple signals.

In some examples, downlink (DL) beam management (BM) can be performed to determine and/or select an optimal beam from a plurality of beams. For example, in 5G NR, DL beam management may be performed based on synchronization signal block (SSB) measurements and/or channel state information (CSI) reference signal (CSI-RS) measurements. A base station (e.g., gNB) can transmit multiple beams or resources in different directions and a UE can measure some (or all) of the beams transmitted by the base station. Each beam measured by the UE can be associated with a measurement value. For example, the UE can measure a reference signal received power (RSRP) value and/or a signal-to-interference-plus noise (SINR) value, among others.

In some cases, the UE can generate and transmit a Layer 1 (L1) (e.g., physical layer) measurement report on an uplink (UL) from the UE to the base station. An uplink channel may include a physical uplink control channel (PUCCH) that carries uplink control information (UCI), a physical uplink shared channel (PUSCH) that carries uplink data, or a physical random access channel (PRACH) used for initial network access, among other examples. In some examples, an L1 measurement report can include SSB and/or CSI-RS measurements (e.g., RSRP and/or SINR values) measured by the UE for corresponding SSB and/or CSI-RS beams or resources transmitted by the base station. The L1 measurement report can be transmitted on the uplink channel associated with the UE (e.g., on PUCCH or PUSCH). Based on receiving the L1 measurement report from the UE, the base station can determine information associated with one or more L1-RSRP or L1-SINR values measured by the UE and perform DL beam management to select a best or optimal beam for subsequent transmissions.

In some cases, DL beam management can be performed based on at least one demodulation reference signal (DMRS). For example, a base station (e.g., gNB) can transmit multiple DMRSs in different directions and using different beams or resources. A UE can measure an RSRP and/or SINR value and generate an L1 measurement report indicative of the DMRS measurement information determined at the UE. In some examples, mixed beam DL beam management can be performed based on a combination of DMRSs, SSBs, and/or CSI-RSs, wherein a UE measures an RSRP and/or SINR value for each respective DMRS, SSB, and/or CSI-RS beam or resource. An L1 measurement report can be generated indicative of the mixed beam measurement information determined at the UE and can subsequently be utilized to performed mixed beam DL beam management.

Transmitting L1 measurement reports can be associated with a large signaling overhead (e.g., between the UE and one or more base stations). For example, in some cases, an L1 measurement report may include 7 bits for the strongest measurements and 4 bits for each of the 3 remaining measurements (e.g., indicating a differential with regard to the strongest measurement). In some examples, multiple measurement reports (e.g., based on multiple reporting settings) may be sent in a single PUCCH or PUSCH. For example, the number of measurement reports that can be transmitted in a single PUCCH or PUSCH may be limited by the PUCCH/PUSCH payload size. If the payload size is not sufficient, then one or more measurements reports with a lowest priority may be dropped.

There is a need to reduce UL signaling overhead associated with transmitting L1 measurement reports and/or associated with performing DL beam management. In some cases, there is an additional need to reduce UL signaling overhead associated with performing DL beam management based on one or more DMRSs. For example, a DMRS can be scheduled on or associated with a Physical Downlink Shared Channel (PDSCH) grant. A UE is required to generate and transmit Hybrid Automat Repeat Request (HARQ) feedback for each PDSCH grant or PDSCH transmission received by the UE. For example, a UE can generate a HARQ acknowledgement (HARQ ACK) based on successfully decoding a PDSCH and can generate a HARQ negative acknowledgement (HARQ NACK) based on unsuccessfully decoding a PDSCH. In some cases, when a DMRS is used to perform DL beam management, a UE may generate and transmit an L1 measurement report and a HARQ ACK/NACK on the UL channel. There is a need to reduce UL signaling overhead associated with transmitting L1 measurement reports and feedback information associated with performing DL beam management.

Systems, apparatuses, processes (also referred to as methods), and computer-readable media (collectively referred to as "systems and techniques") are described herein that can be used to generate a mixed beam report that includes mixed beam information (e.g., RSRP and/or SINR measurements, or indications thereof) for a plurality of reference signals and includes feedback information associated with receiving at least a portion of the plurality of reference signals. For example, a single measurement report can be generated to include both the mixed beam information and the feedback information. In some aspects, the mixed beam information can include measurement information for one or more DMRSs and measurement information for one or more CSI-RSs, SSBs, or other reference signal types. The feedback information can be HARQ feedback information (e.g., ACK/NACK) associated with receiving and decoding a PDSCH associated with each of the one or more DMRSs. In some examples, the mixed beam information can include at least one measured (e.g., absolute) RSRP/SINR value determined for one reference signal of the plurality of reference signals. For example, the mixed beam information can include the RSRP/SINR measurement with the greatest absolute value. In some cases, the beam information can include differential values (e.g., relative to the RSRP/SINR value with the greatest absolute value) for the remaining reference signals of the plurality of reference signals.

In some examples, the feedback information can be HARQ feedback information (e.g., HARQ ACK/NACK) that is generated based on receiving and decoding a PDSCH associated with DMRS reference signals. In some cases, the mixed beam report may not include feedback information and/or HARQ feedback information for non-DMRS reference signals (e.g., CSI-RS, SSB, etc.). In some cases, the mixed beam report can include HARQ feedback information and beam information. For example, HARQ ACKs/NACKs can be explicitly included or otherwise signaled in the mixed beam report. In some examples, the mixed beam report can beam information and implicit HARQ feedback information. For example, a HARQ ACK can be implicitly signaled based on including a beam measurement value or other beam information for a given DMRS beam, DMRSI, PDSCH, etc. A HARQ NACK can be implicitly signaled based on not including a beam measurement value or other beam information for the given DMRS beam, DMRSI, PDSCH, etc. In some examples, the mixed beam report can include multi-bit feedback information (e.g., feedback information entries each including two or more bits). For example, a multi-bit feedback information value can jointly encode HARQ feedback (e.g., HARQ ACK/NACK) and beam information, wherein the HARQ feedback and the beam information are associated with the same given DMRS beam, DMRSI, PDSCH, etc. In some cases, one bit of the multi-bit feedback information value can encode or indicate a HARQ ACK or a HARQ NACK and a second bit of the multi-bit feedback information can encode beam information comparing an L1-RSRP measurement to a pre-determined threshold. For example, a first value (e.g., '0') of the beam information bit can indicate that the L1-RSRP was less than the pre-determined threshold and a second value (e.g., '1' of the beam information bit can indicate that the L1-RSRP was greater than or equal to the pre-determined threshold.

Further aspects of the systems and techniques will be described with respect to the figures.

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

As used herein, the terms "user equipment" (UE) and "network entity" are not intended to be specific or otherwise limited to any particular radio access technology (RAT), unless otherwise noted. In general, a UE may be any wireless communication device (e.g., a mobile phone, router, tablet computer, laptop computer, and/or tracking device, etc.), wearable (e.g., smartwatch, smart-glasses, wearable ring, and/or an extended reality (XR) device such as a virtual reality (VR) headset, an augmented reality (AR) headset or glasses, or a mixed reality (MR) headset), vehicle (e.g., automobile, motorcycle, bicycle, etc.), aircraft (e.g., an airplane, jet, unmanned aerial vehicle (UAV) or drone, helicopter, airship, glider, etc.), and/or Internet of Things (IoT) device, etc., used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or "UT," a "mobile device," a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on IEEE 802.11 communication standards, etc.), and so on.

A network entity can be implemented in an aggregated or monolithic base station architecture, or alternatively, in a disaggregated base station architecture, and may include one or more of a central unit (CU), a distributed unit (DU), a radio unit (RU), a Near-Real Time (Near-RT) RAN Intelligent Controller (RIC), or a Non-Real Time (Non-RT) RIC. A base station (e.g., with an aggregated/monolithic base station architecture or disaggregated base station architecture) may operate according to one of several RATs in communication with UEs depending on the network in which it is deployed, and may be alternatively referred to as an access point (AP), a network node, a NodeB (NB), an evolved NodeB (eNB), a next generation eNB (ng-eNB), a New Radio (NR) Node B (also referred to as a gNB or gNodeB), etc. A base station may be used primarily to support wireless access by UEs, including supporting data, voice, and/or signaling connections for the supported UEs. In some systems, a base station may provide edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, or a forward traffic channel, etc.). The term traffic channel (TCH), as used herein, can refer to either an uplink, reverse or downlink, and/or a forward traffic channel.

The term "network entity" or "base station" (e.g., with an aggregated/monolithic base station architecture or disaggregated base station architecture) may refer to a single physical transmit receive point (TRP) or to multiple physical TRPs that may or may not be co-located. For example, where the term "network entity" or "base station" refers to a single physical TRP, the physical TRP may be an antenna of the base station corresponding to a cell (or several cell sectors) of the base station. Where the term "network entity" or "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (e.g., a network of spatially separated antennas connected to a common source via a transport medium) or a remote radio head (RRH) (e.g., a remote base station connected to a serving base station). Alternatively, the non-co-located physical TRPs may be the serving base station receiving the measurement report from the UE and a neighbor base station whose reference radio frequency (RF) signals (e.g., or simply "reference signals") the UE is measuring. Because a TRP is the point from which a base station transmits and receives wireless signals, as used herein, references to transmission from or reception at a base station are to be understood as referring to a particular TRP of the base station.

In some implementations that support positioning of UEs, a network entity or base station may not support wireless access by UEs (e.g., may not support data, voice, and/or signaling connections for UEs), but may instead transmit reference signals to UEs to be measured by the UEs, and/or may receive and measure signals transmitted by the UEs. Such a base station may be referred to as a positioning beacon (e.g., when transmitting signals to UEs) and/or as a location measurement unit (e.g., when receiving and measuring signals from UEs).

As described herein, a node (which may be referred to as a node, a network node, a network entity, or a wireless node) may include, be, or be included in (e.g., be a component of) a base station (e.g., any base station described herein), a UE (e.g., any UE described herein), a network controller, an apparatus, a device, a computing system, an integrated access and backhauling (IAB) node, a distributed unit (DU), a central unit (CU), a remote/radio unit (RU) (which may also be referred to as a remote radio unit (RRU)), and/or another processing entity configured to perform any of the techniques described herein. For example, a network node may be a UE. As another example, a network node may be a base station or network entity. As another example, a first network node may be configured to communicate with a second network node or a third network node. In one aspect of this example, the first network node may be a UE, the second network node may be a base station, and the third network node may be a UE. In another aspect of this example, the first network node may be a UE, the second network node may be a base station, and the third network node may be a base station. In yet other aspects of this example, the first, second, and third network nodes may be different relative to these examples. Similarly, reference to a UE, base station, apparatus, device, computing system, or the like may include disclosure of the UE, base station, apparatus, device, computing system, or the like being a network node. For example, disclosure that a UE is configured to receive information from a base station also discloses that a first network node is configured to receive information from a second network node. Consistent with this disclosure, once a specific example is broadened in accordance with this disclosure (e.g., a UE is configured to receive information from a base station also discloses that a first network node is configured to receive information from a second network node), the broader example of the narrower example may be interpreted in the reverse, but in a broad open-ended way. In the example above where a UE is configured to receive information from a base station also discloses that a first network node is configured to receive information from a second network node, the first network node may refer to a first UE, a first base station, a first apparatus, a first device, a first computing system, a first set of one or more one or more components, a first processing entity, or the like configured to receive the information; and the second network node may refer to a second UE, a second base station, a second apparatus, a second device, a second computing system, a second set of one or more components, a second processing entity, or the like.

As described herein, communication of information (e.g., any information, signal, or the like) may be described in various aspects using different terminology. Disclosure of one communication term includes disclosure of other communication terms. For example, a first network node may be described as being configured to transmit information to a second network node. In this example and consistent with this disclosure, disclosure that the first network node is configured to transmit information to the second network node includes disclosure that the first network node is configured to provide, send, output, communicate, or transmit information to the second network node. Similarly, in this example and consistent with this disclosure, disclosure that the first network node is configured to transmit information to the second network node includes disclosure that the second network node is configured to receive, obtain, or decode the information that is provided, sent, output, communicated, or transmitted by the first network node.

An RF signal comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. As used herein, an RF signal may also be referred to as a "wireless signal" or simply a "signal" where it is clear from the context that the term "signal" refers to a wireless signal or an RF signal.

Various aspects of the systems and techniques described herein will be discussed below with respect to the figures. According to various aspects, FIG. 1 illustrates an example of a wireless communications system 100. The wireless communications system 100 (e.g., which may also be referred to as a wireless wide area network (WWAN)) can include various base stations 102 and various UEs 104. In some aspects, the base stations 102 may also be referred to as "network entities" or "network nodes." One or more of the base stations 102 can be implemented in an aggregated or monolithic base station architecture. Additionally, or alternatively, one or more of the base stations 102 can be implemented in a disaggregated base station architecture, and may include one or more of a central unit (CU), a distributed unit (DU), a radio unit (RU), a Near-Real Time (Near-RT) RAN Intelligent Controller (RIC), or a Non-Real Time (Non-RT) RIC. The base stations 102 can include macro cell base stations (e.g., high power cellular base stations) and/or small cell base stations (e.g., low power cellular base stations). In an aspect, the macro cell base station may include eNBs and/or ng-eNBs where the wireless communications system 100 corresponds to a long-term evolution (LTE) network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or a 5G core (5GC)) through backhaul links 122, and through the core network 170 to one or more location servers 172 (e.g., which may be part of core network 170 or may be external to core network 170). In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC or 5GC) over backhaul links 134, which may be wired and/or wireless.

The base stations 102 may wirelessly communicate with the UEs 104. Each of the base stations 102 may provide communication coverage for a respective geographic coverage area 110. In an aspect, one or more cells may be supported by a base station 102 in each coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), a virtual cell identifier (VCI), a cell global identifier (CGI)) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both of the logical communication entity and the base station that supports it, depending on the context. In addition, because a TRP is typically the physical transmission point of a cell, the terms "cell" and "TRP" may be used interchangeably. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' may have a coverage area 110' that substantially overlaps with the coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include uplink (e.g., also referred to as reverse link) transmissions from a UE 104 to a base station 102 and/or downlink (e.g., also referred to as forward link) transmissions from a base station 102 to a UE 104. The communication links 120 may use MIMO antenna technology, including spatial multiplexing, beamforming, and/or transmit diversity. The communication links 120 may be provided using one or more carrier frequencies. Allocation of carriers may be asymmetric with respect to downlink and uplink (e.g., a greater or lesser quantity of carriers may be allocated for downlink than for uplink).

Beamforming, which may also be referred to as spatial filtering, directional transmission, or directional reception, is a signal processing technique that may be used at a transmitting device or a receiving device (e.g., one or more of the base stations 102, UEs 104, etc.) to shape or steer an antenna beam (e.g., a transmit beam, a receive beam) along a spatial path between the transmitting device and the receiving device. Beamforming may be implemented based on combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A transmitting device and/or a receiving device (e.g., such as one or more of base stations 102 and/or UEs 104) may use beam sweeping techniques as part of beam forming operations. For example, a base station 102 (e.g., or other transmitting device) may use multiple antennas or antenna arrays (e.g., antenna panels) to conduct beamforming operations for directional communications with a UE 104 (e.g., or other receiving device). Some signals (e.g., synchronization signals, reference signals, beam selection signals, or other control signals) may be transmitted by base station 102 (or other transmitting device) multiple times in different directions. For example, the base station 102 may transmit a signal according to different beamforming weight sets associated with different directions of transmission. Transmissions in different beam directions may be used to identify (e.g., by a transmitting device, such as a base station 102, or by a receiving device, such as a UE 104) a beam direction for later transmission or reception by the base station 102.

Some signals, such as data signals associated with a particular receiving device, may be transmitted by a base station 102 in a single beam direction (e.g., a direction associated with the receiving device, such as a UE 104). In some examples, the beam direction associated with transmissions along a single beam direction may be determined based on a signal that was transmitted in one or more beam directions. For example, a UE 104 may receive one or more of the signals transmitted by the base station 102 in different directions and may report to the base station 104 an indication of the signal that the UE 104 received with a highest signal quality or an otherwise acceptable signal quality.

In some examples, transmissions by a device (e.g., by a base station 102 or a UE 104) may be performed using multiple beam directions, and the device may use a combination of digital precoding or radio frequency beamforming to generate a combined beam for transmission (e.g., from a base station 102 to a UE 104, from a transmitting device to a receiving device, etc.). The UE 104 may report feedback that indicates precoding weights for one or more beam directions, and the feedback may correspond to a configured number of beams across a system bandwidth or one or more sub-bands. The base station 102 may transmit a reference signal (e.g., a cell-specific reference signal (CRS), a channel state information reference signal (CSI-RS), etc.), which may be precoded or unprecoded. The UE 104 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 102, a UE 104 may employ similar techniques for transmitting signals multiple times in different directions (e.g., for identifying a beam direction for subsequent transmission or reception by the UE 104) or for transmitting a signal in a single direction (e.g., for transmitting data to a receiving device).

A receiving device (e.g., a UE 104) may try multiple receive configurations (e.g., directional listening) when receiving various signals from the base station 102, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may further include a WLAN AP 150 in communication with WLAN stations (STAs) 152 via communication links 154 in an unlicensed frequency spectrum (e.g., 5 Gigahertz (GHz)). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available. In some examples, the wireless communications system 100 can include devices (e.g., UEs, etc.) that communicate with one or more UEs 104, base stations 102, APs 150, etc., utilizing the ultra-wideband (UWB) spectrum. The UWB spectrum can range from 3.1 to 10.5 GHz.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE and/or 5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a millimeter wave (mmW) base station 180 that may operate in mmW frequencies and/or near mmW frequencies in communication with a UE 182. The mmW base station 180 may be implemented in an aggregated or monolithic base station architecture, or alternatively, in a disaggregated base station architecture (e.g., including one or more of a CU, a DU, a RU, a Near-RT RIC, or a Non-RT RIC). Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW and/or near mmW radio frequency band have high path loss and a relatively short range. The mmW base station 180 and the UE 182 may utilize beamforming (e.g., transmit and/or receive) over an mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

In some aspects relating to 5G, the frequency spectrum in which wireless network nodes or entities (e.g., base stations 102/180, UEs 104/182) operate is divided into multiple frequency ranges, FR1 (e.g., from 450 to 6,000 Megahertz (MHz)), FR2 (e.g., from 24,250 to 52,600 MHz), FR3 (e.g., above 52,600 MHz), and FR4 (e.g., between FR1 and FR2). In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (e.g., whether a PCell or an SCell) corresponds to a carrier frequency and/or component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). In carrier aggregation, the base stations 102 and/or the UEs 104 may use spectrum up to Y MHz (e.g., 5, 10, 15, 20, 100 MHz) bandwidth per carrier up to a total of Yx MHz (e.g., x component carriers) for transmission in each direction. The component carriers may or may not be adjacent to each other on the frequency spectrum. Allocation of carriers may be asymmetric with respect to the downlink and uplink (e.g., a greater or lesser quantity of carriers may be allocated for downlink than for uplink). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (e.g., 40 MHz), compared to that attained by a single 20 MHz carrier.

In order to operate on multiple carrier frequencies, a base station 102 and/or a UE 104 can be equipped with multiple receivers and/or transmitters. For example, a UE 104 may have two receivers, "Receiver 1" and "Receiver 2," where "Receiver 1" is a multi-band receiver that can be tuned to band (e.g., carrier frequency) 'X' or band 'Y,' and "Receiver 2" is a one-band receiver tunable to band 'Z' only. In this example, if the UE 104 is being served in band 'X,' band 'X' would be referred to as the PCell or the active carrier frequency, and "Receiver 1" would need to tune from band 'X' to band 'Y' (e.g., an SCell) in order to measure band 'Y' (and vice versa). In contrast, whether the UE 104 is being served in band 'X' or band 'Y,' because of the separate "Receiver 2," the UE 104 can measure band 'Z' without interrupting the service on band 'X' or band 'Y.'

The wireless communications system 100 may further include a UE 164 that may communicate with a macro cell base station 102 over a communication link 120 and/or the mmW base station 180 over an mmW communication link 184. For example, the macro cell base station 102 may support a PCell and one or more SCells for the UE 164 and the mmW base station 180 may support one or more SCells for the UE 164.

The wireless communications system 100 may further include one or more UEs, such as UE 190, that connects indirectly to one or more communication networks via one or more device-to-device (D2D) peer-to-peer (P2P) links (e.g., referred to as "sidelinks"). In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (e.g., through which UE 190 may indirectly obtain WLAN-based Internet connectivity). In an example, the D2D P2P links 192 and 194 may be supported with any well-known D2D RAT, such as LTE Direct (LTE-D), Wi-Fi Direct (Wi-Fi-D), Bluetooth®, and so on.

Figure 2:
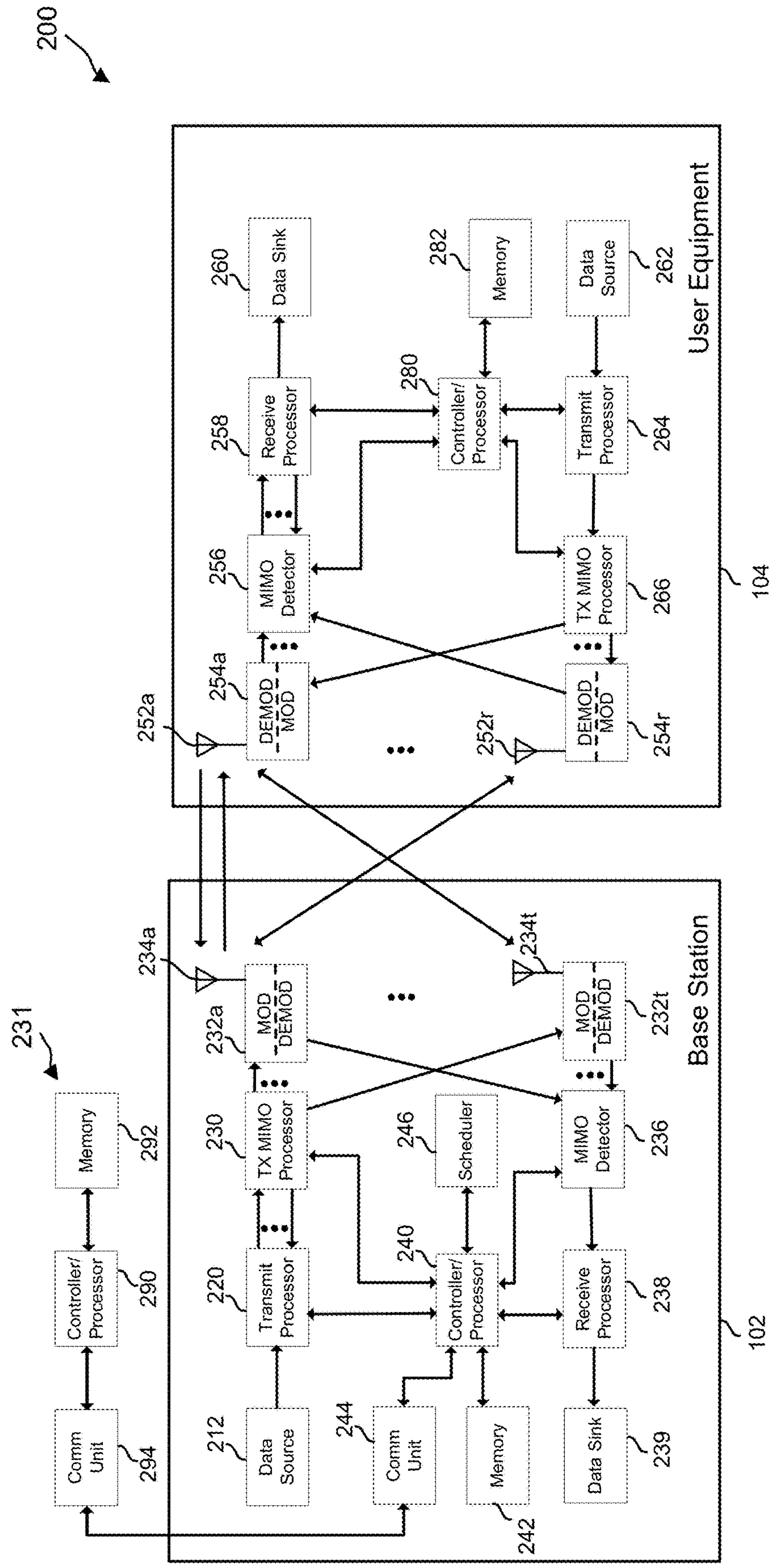
FIG. 2 is a diagram illustrating a design of a base station and a User Equipment (UE) device that enable transmission and processing of signals exchanged between the UE and the base station, in accordance with some examples.

FIG. 2 illustrates a block diagram of an example architecture 200 of a base station 102 and a UE 104 that enables transmission and processing of signals exchanged between the UE and the base station, in accordance with some aspects of the present disclosure. Example architecture 200 includes components of a base station 102 and a UE 104, which may be one of the base stations 102 and one of the UEs 104 illustrated in FIG. 1. Base station 102 may be equipped with T antennas 234_a_ through 234_t_, and UE 104 may be equipped with R antennas 252_a_ through 252_r_, where in general $T \geq 1$ and $R \geq 1$.

At base station 102, a transmit processor 220 may receive data from a data source 212 for one or more UEs, select one or more modulation and coding schemes (MCS) for each UE based on channel quality indicators (CQIs) received from the UE, process (e.g., encode and modulate) the data for each UE based on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232_a_ through 232_t_. The modulators 232_a_ through 232_t_ are shown as a combined modulator-demodulator (MOD-DEMOD). In some cases, the modulators and demodulators can be separate components. Each modulator of the modulators 232_a_ to 232_t_ may process a respective output symbol stream (e.g., for an orthogonal frequency-division multiplexing (OFDM) scheme and/or the like) to obtain an output sample stream. Each modulator of the modulators 232_a_ to 232_t_ may further process (e.g., convert to analog, amplify, filter, and upconvert) the output sample stream to obtain a downlink signal. T downlink signals may be transmitted from modulators 232_a_ to 232_t_ via T antennas 234_a_ through 234_t_, respectively. According to certain aspects described in more detail below, the synchronization signals can be generated with location encoding to convey additional information.

At UE 104, antennas 252_a_ through 252_r_ may receive the downlink signals from base station 102 and/or other base stations and may provide received signals to one or more demodulators (DEMODs) 254_a_ through 254_r_, respectively. The demodulators 254_a_ through 254_r_ are shown as a combined modulator-demodulator (MOD-DEMOD). In some cases, the modulators and demodulators can be separate components. Each demodulator of the demodulators 254_a_ through 254_r_ may condition (e.g., filter, amplify, downconvert, and digitize) a received signal to obtain input samples. Each demodulator of the demodulators 254_a_ through 254_r_ may further process the input samples (e.g., for OFDM and/or the like) to obtain received symbols. A MIMO detector 256 may obtain received symbols from all R demodulators 254_a_ through 254_r_, perform MIMO detection on the received symbols if applicable, and provide detected symbols. A receive processor 258 may process (e.g., demodulate and decode) the detected symbols, provide decoded data for UE 104 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like.

On the uplink, at UE 104, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals (e.g., based on a beta value or a set of beta values associated with the one or more reference signals). The symbols from transmit processor 264 may be precoded by a TX-MIMO processor 266, further processed by modulators 254*a* through 254*r* (e.g., for DFT-s-OFDM, CP-OFDM, and/or the like), and transmitted to base station 102. At base station 102, the uplink signals from UE 104 and other UEs may be received by antennas 234*a* through 234*t*, processed by demodulators 232*a* through 232*t*, detected by a MIMO detector 236 (e.g., if applicable), and further processed by a receive processor 238 to obtain decoded data and control information sent by UE 104. Receive processor 238 may provide the decoded data to a data sink 239 and the decoded control information to controller (e.g., processor) 240. Base station 102 may include communication unit 244 and communicate to a network controller 231 via communication unit 244. Network controller 231 may include communication unit 294, controller/processor 290, and memory 292.

In some aspects, one or more components of UE 104 may be included in a housing. Controller 240 of base station 102, controller/processor 280 of UE 104, and/or any other component(s) of FIG. 2 may perform one or more techniques associated with implicit UCI beta value determination for NR.

Memories 242 and 282 may store data and program codes for the base station 102 and the UE 104, respectively. A scheduler 246 may schedule UEs for data transmission on the downlink, uplink, and/or sidelink.

In some aspects, deployment of communication systems, such as 5G new radio (NR) systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (e.g., such as a Node B (NB), evolved NB (eNB), NR BS, 5G NB, access point (AP), a transmit receive point (TRP), or a cell, etc.) may be implemented as an aggregated base station (e.g., also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (e.g., such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual central unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an open radio access network (O-RAN (e.g., such as the network configuration sponsored by the O-RAN Alliance)), or a virtualized radio access network (e.g., vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

Figure 3:
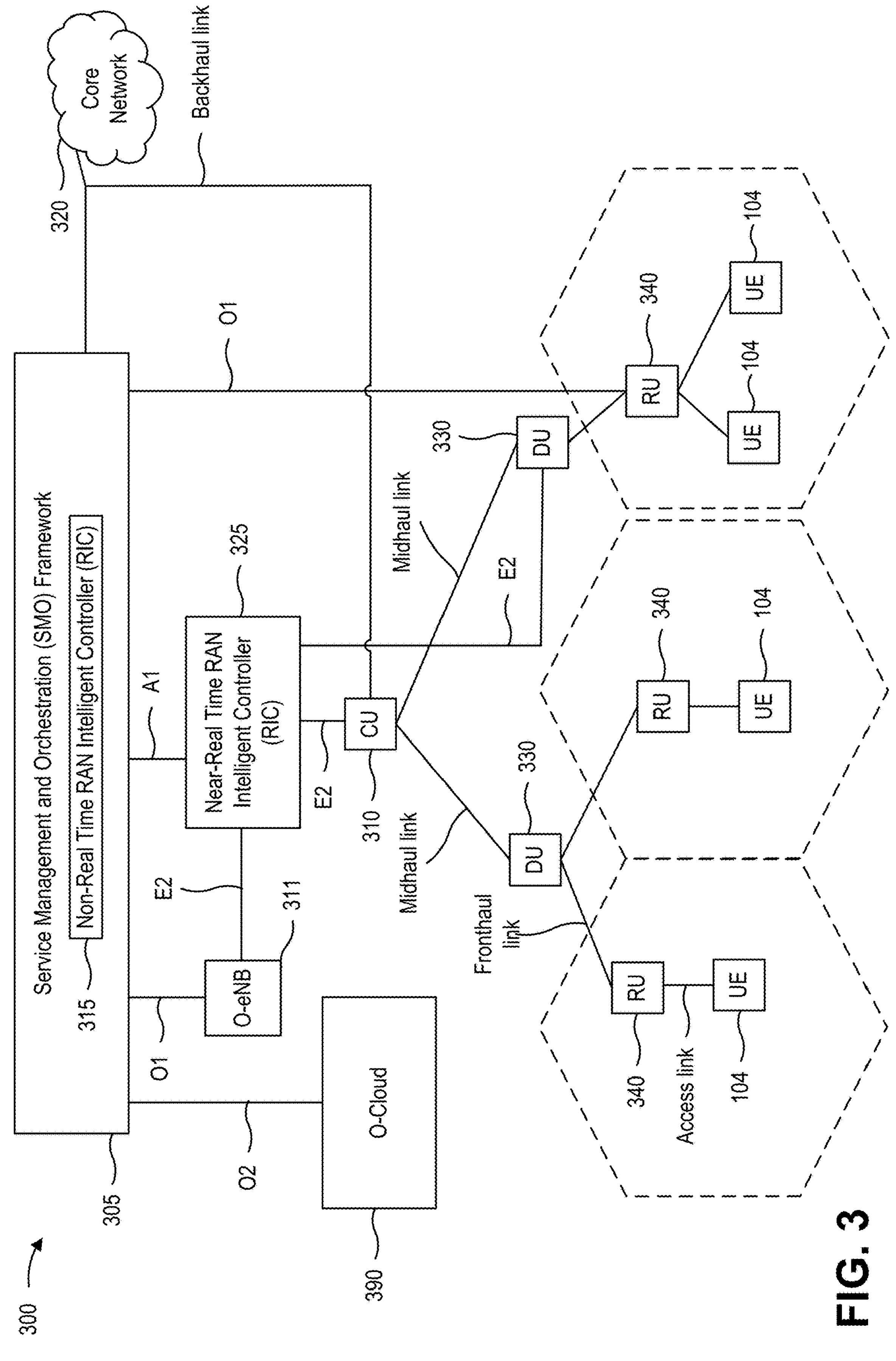
FIG. 3 is a diagram illustrating an example of a disaggregated base station, in accordance with some examples.

FIG. 3 is a diagram illustrating an example disaggregated base station 300 architecture. The disaggregated base station 300 architecture may include one or more central units (CUs) 310 that can communicate directly with a core network 320 via a backhaul link, or indirectly with the core network 320 through one or more disaggregated base station units (e.g., such as a Near-Real Time (Near-RT) RAN Intelligent Controller (RIC) 325 via an E2 link, or a Non-Real Time (Non-RT) RIC 315 associated with a Service Management and Orchestration (SMO) Framework 305, or both). A CU 310 may communicate with one or more distributed units (DUs) 330 via respective midhaul links, such as an F1 interface. The DUs 330 may communicate with one or more radio units (RUs) 340 via respective fronthaul links. The RUs 340 may communicate with respective UEs 104 via one or more radio frequency (RF) access links. In some implementations, the UE 104 may be simultaneously served by multiple RUs 340.

Each of the units (e.g., the CUs 310, the DUs 330, the RUs 340, as well as the Near-RT RICs 325, the Non-RT RICs 315, and the SMO Framework 305) illustrated in FIG. 3 and/or described herein may include one or more interfaces or be coupled to one or more interfaces configured to receive or transmit signals, data, or information (e.g., collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (e.g., such as a radio frequency (RF) transceiver), configured to receive or transmit signals, or both, over a wireless transmission medium to one or more of the other units.

In some aspects, the CU 310 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 310. The CU 310 may be configured to handle user plane functionality (e.g., Central Unit-User Plane (CU-UP)), control plane functionality (e.g., Central Unit-Control Plane (CU-CP)), or a combination thereof. In some implementations, the CU 310 can be logically split into one or more CU-UP units and one or more CU-CP units. The CU-UP unit can communicate bidirectionally with the CU-CP unit via an interface, such as the E1 interface when implemented in an O-RAN configuration. The CU 310 can be implemented to communicate with the DU 330, as necessary, for network control and signaling.

The DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers (e.g., such as modules for forward error correction (FEC) encoding and decoding, scrambling, modulation and demodulation, or the like) depending on a functional split, such as those defined by the 3rd Generation Partnership Project (3GPP). In some aspects, the DU 330 may further host one or more low PHY layers. Each layer (or module) can be implemented with an interface configured to communicate signals with other layers (and modules) hosted by the DU 330, or with the control functions hosted by the CU 310.

Lower-layer functionality can be implemented by one or more RUs 340. In some deployments, an RU 340, controlled by a DU 330, may correspond to a logical node that hosts RF processing functions, or low-PHY layer functions (e.g., such as performing fast Fourier transform (FFT), inverse FFT (iFFT), digital beamforming, physical random-access channel (PRACH) extraction and filtering, or the like), or both, based on the functional split, such as a lower layer functional split. In such an architecture, the RU(s) 340 can be implemented to handle over the air (OTA) communication with one or more UEs 104. In some implementations, real-time and non-real-time aspects of control and user plane communication with the RU(s) 340 can be controlled by the corresponding DU 330. In some scenarios, this configuration can enable the DU(s) 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements which may be managed via an operations and maintenance interface (e.g., such as an O1 interface). For virtualized network elements, the SMO Framework 305 may be configured to interact with a cloud computing platform (e.g., such as an open cloud (O-Cloud) 390) to perform network element life cycle management (e.g., such as to instantiate virtualized network elements) via a cloud computing platform interface (e.g., such as an O2 interface). Such virtualized network elements can include, but are not limited to, CUs 310, DUs 330, RUs 340, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with one or more RUs 340 via an O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (e.g., such as via an A1 interface) the Near-RT RIC 325. The Near-RT RIC 325 may be configured to include a logical function that enables near-real-time control and optimization of RAN elements and resources via data collection and actions over an interface (e.g., such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (e.g., such as reconfiguration via O1) or via creation of RAN management policies (e.g., such as A1 policies).

Figure 4:
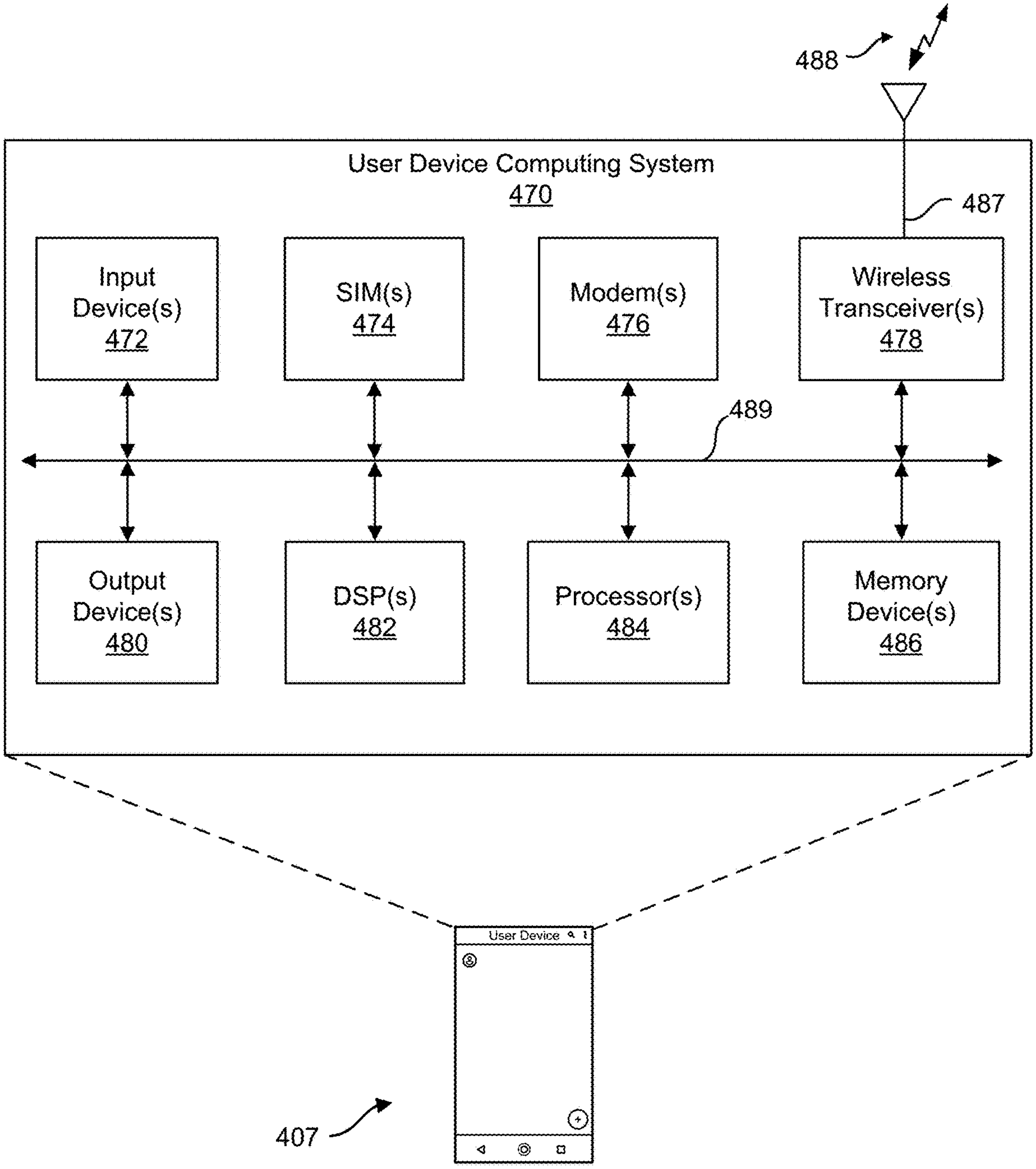
FIG. 4 is a block diagram illustrating components of a user equipment (UE), in accordance with some examples.

FIG. 4 illustrates an example of a computing system 470 of a wireless device 407. The wireless device 407 may include a client device such as a UE (e.g., UE 104, UE 152, UE 190) or other type of device (e.g., a station (STA) configured to communication using a Wi-Fi interface) that may be used by an end-user. For example, the wireless device 407 may include a mobile phone, router, tablet computer, laptop computer, tracking device, wearable device (e.g., a smart watch, glasses, an extended reality (XR) device such as a virtual reality (VR), augmented reality (AR), or mixed reality (MR) device, etc.), Internet of Things (IoT) device, a vehicle, an aircraft, and/or another device that is configured to communicate over a wireless communications network. The computing system 470 includes software and hardware components that may be electrically or communicatively coupled via a bus 489 (e.g., or may otherwise be in communication, as appropriate). For example, the computing system 470 includes one or more processors 484. The one or more processors 484 may include one or more CPUs, ASICs, FPGAs, APs, GPUs, VPUs, NSPs, microcontrollers, dedicated hardware, any combination thereof, and/or other processing device or system. The bus 489 may be used by the one or more processors 484 to communicate between cores and/or with the one or more memory devices 486.

The computing system 470 may also include one or more memory devices 486, one or more digital signal processors (DSPs) 482, one or more SIMs 474, one or more modems 476, one or more wireless transceivers 478, an antenna 487, one or more input devices 472 (e.g., a camera, a mouse, a keyboard, a touch sensitive screen, a touch pad, a keypad, a microphone, and/or the like), and one or more output devices 480 (e.g., a display, a speaker, a printer, and/or the like).

In some aspects, computing system 470 may include one or more radio frequency (RF) interfaces configured to transmit and/or receive RF signals. In some examples, an RF interface may include components such as modem(s) 476, wireless transceiver(s) 478, and/or antennas 487. The one or more wireless transceivers 478 may transmit and receive wireless signals (e.g., signal 488) via antenna 487 from one or more other devices, such as other wireless devices, network devices (e.g., base stations such as eNBs and/or gNBs, Wi-Fi access points (APs) such as routers, range extenders or the like, etc.), cloud networks, and/or the like. In some examples, the computing system 470 may include multiple antennas or an antenna array that may facilitate simultaneous transmit and receive functionality. Antenna 487 may be an omnidirectional antenna such that radio frequency (RF) signals may be received from and transmitted in all directions. The wireless signal 488 may be transmitted via a wireless network. The wireless network may be any wireless network, such as a cellular or telecommunications network (e.g., 3G, 4G, 5G, etc.), wireless local area network (e.g., a Wi-Fi network), a Bluetooth™ network, and/or other network.

In some examples, the wireless signal 488 may be transmitted directly to other wireless devices using sidelink communications (e.g., using a PC5 interface, using a DSRC interface, etc.). Wireless transceivers 478 may be configured to transmit RF signals for performing sidelink communications via antenna 487 in accordance with one or more transmit power parameters that may be associated with one or more regulation modes. Wireless transceivers 478 may also be configured to receive sidelink communication signals having different signal parameters from other wireless devices.

In some examples, the one or more wireless transceivers 478 may include an RF front end including one or more components, such as an amplifier, a mixer (e.g., also referred to as a signal multiplier) for signal down conversion, a frequency synthesizer (e.g., also referred to as an oscillator) that provides signals to the mixer, a baseband filter, an analog-to-digital converter (ADC), one or more power amplifiers, among other components. The RF front-end may generally handle selection and conversion of the wireless signals 488 into a baseband or intermediate frequency and may convert the RF signals to the digital domain.

In some cases, the computing system 470 may include a coding-decoding device (or CODEC) configured to encode and/or decode data transmitted and/or received using the one or more wireless transceivers 478. In some cases, the computing system 470 may include an encryption-decryption device or component configured to encrypt and/or decrypt data (e.g., according to the AES and/or DES standard) transmitted and/or received by the one or more wireless transceivers 478.

The one or more SIMs 474 may each securely store an international mobile subscriber identity (IMSI) number and related key assigned to the user of the wireless device 407. The IMSI and key may be used to identify and authenticate the subscriber when accessing a network provided by a network service provider or operator associated with the one or more SIMs 474. The one or more modems 476 may modulate one or more signals to encode information for transmission using the one or more wireless transceivers 478. The one or more modems 476 may also demodulate signals received by the one or more wireless transceivers 478 in order to decode the transmitted information. In some examples, the one or more modems 476 may include a Wi-Fi modem, a 4G (or LTE) modem, a 5G (or NR) modem, and/or other types of modems. The one or more modems 476 and the one or more wireless transceivers 478 may be used for communicating data for the one or more SIMs 474.

The computing system 470 may also include (and/or be in communication with) one or more non-transitory machine-readable storage media or storage devices (e.g., one or more memory devices 486), which may include, without limitation, local and/or network accessible storage, a disk drive, a drive array, an optical storage device, a solid-state storage device such as a RAM and/or a ROM, which may be programmable, flash-updateable, and/or the like. Such storage devices may be configured to implement any appropriate data storage, including without limitation, various file systems, database structures, and/or the like.

In various aspects, functions may be stored as one or more computer-program products (e.g., instructions or code) in memory device(s) 486 and executed by the one or more processor(s) 484 and/or the one or more DSPs 482. The computing system 470 may also include software elements (e.g., located within the one or more memory devices 486), including, for example, an operating system, device drivers, executable libraries, and/or other code, such as one or more application programs, which may comprise computer programs implementing the functions provided by various aspects, and/or may be designed to implement methods and/or configure systems, as described herein.

Figure 5:
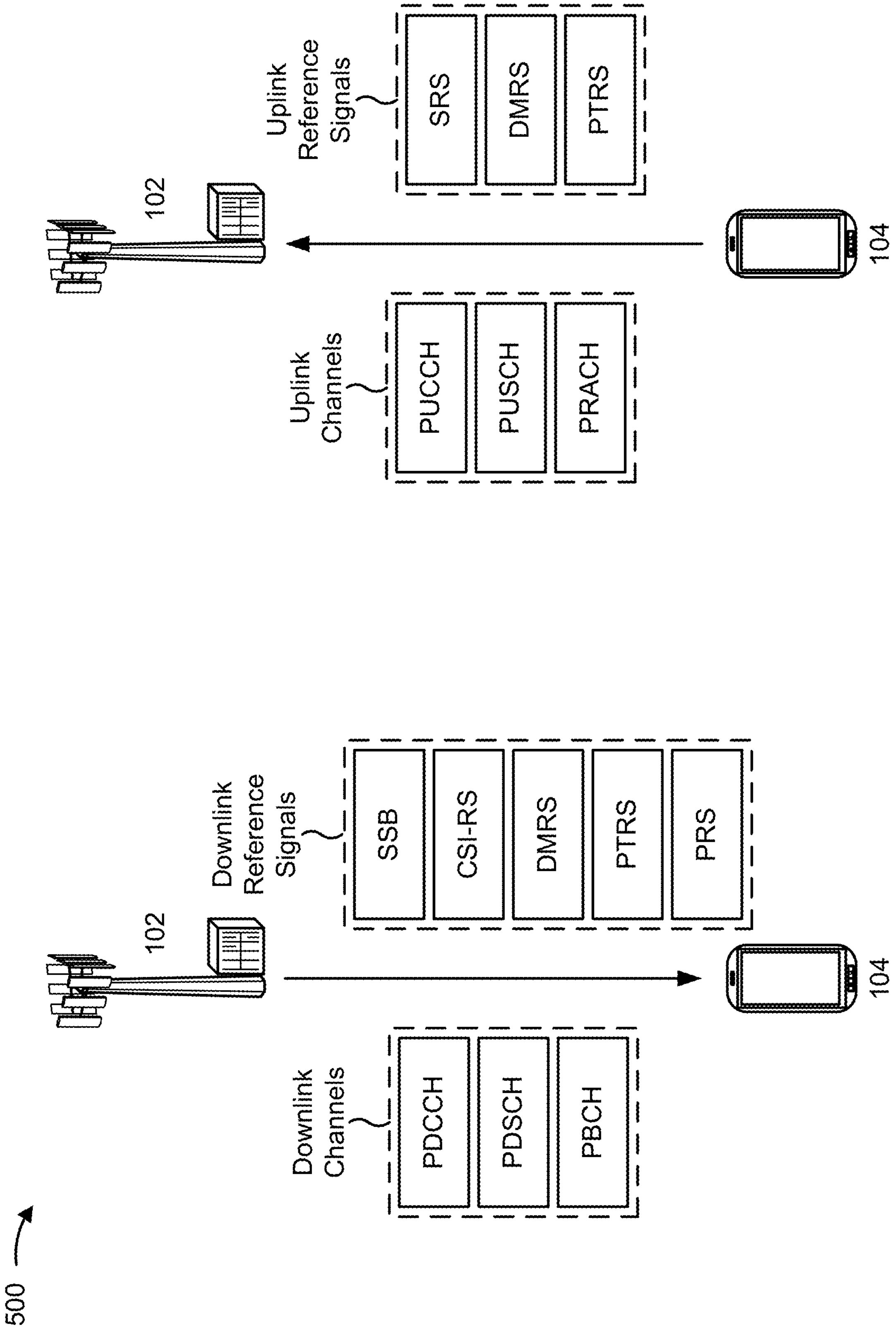
FIG. 5 is a diagram illustrating an example of physical channels and reference signals in a wireless network, in accordance with some examples.

FIG. 5 is a diagram illustrating an example 500 of physical channels and reference signals in a wireless network. In some examples, one or more downlink channels and one or more downlink reference signals may carry information from a base station 102 to a UE 104. One or more uplink channels and one or more uplink reference signals may carry information from UE 104 to base station 102.

In some aspects, a downlink channel may include one or more of a physical downlink control channel (PDCCH) that carries downlink control information (DCI), a physical downlink shared channel (PDSCH) that carries downlink data, and/or a physical broadcast channel (PBCH) that carries system information, among other examples. In some aspects, PDSCH communications may be scheduled by PDCCH communications.

In some examples, an uplink channel may include one or more of a physical uplink control channel (PUCCH) that carries uplink control information (UCI), a physical uplink shared channel (PUSCH) that carries uplink data, and/or a physical random access channel (PRACH) used for initial network access, among other examples. In some aspects, UE 104 may transmit acknowledgement (ACK) or negative acknowledgement (NACK) feedback (e.g., ACK/NACK feedback or ACK/NACK information) in UCI on the PUCCH and/or the PUSCH.

In some cases, a downlink reference signal may include one or more of a synchronization signal block (SSB), a channel state information (CSI) reference signal (CSI-RS), a demodulation reference signal (DMRS), a positioning reference signal (PRS), and/or a phase tracking reference signal (PTRS), among other examples. In some examples, an uplink reference signal may include one or more of a sounding reference signal (SRS), a DMRS, and/or a PTRS, among other examples.

An SSB may carry or include information used for initial network acquisition and synchronization. For example, an SSB can carry or include one or more of a primary synchronization signal (PSS), a secondary synchronization signal (SSS), a PBCH, and/or a PBCH DMRS. An SSB may also be referred to as a synchronization signal/PBCH (SS/PBCH) block. In some aspects, base station 102 may transmit multiple SSBs on multiple corresponding beams, and the SSBs may be used for beam selection.

A CSI-RS may carry information used for downlink channel estimation (e.g., downlink CSI acquisition), which may be used for scheduling, link adaptation, or beam management, among other examples. For example, base station 102 can configure a set of CSI-RSs for UE 104, and UE 104 can measure the configured set of CSI-RSs. Based on the CSI-RS measurements, UE 104 can perform channel estimation and report channel estimation parameters to base station 102 (e.g., in a CSI report). For example, the channel estimation parameters can include one or more of a channel quality indicator (CQI), a precoding matrix indicator (PMI), a CSI-RS resource indicator (CRI), a layer indicator (LI), a rank indicator (RI), and/or a reference signal received power (RSRP), among other examples.

In some examples, base station 102 can use the CSI report to select transmission parameters for downlink communications to UE 104. For example, base station 102 can use the CSI report to select transmission parameters that include one or more of a quantity of transmission layers (e.g., a rank), a precoding matrix (e.g., a precoder), a modulation and coding scheme (MCS), and/or a refined downlink beam (e.g., using a beam refinement procedure or a beam management procedure), among other examples.

A DMRS may carry information used to estimate a radio channel for demodulation of an associated physical channel (e.g., PDCCH, PDSCH, PBCH, PUCCH, or PUSCH). The design and mapping of a DMRS may be specific to a physical channel for which the DMRS is used for estimation. DMRSs are UE-specific, can be beamformed, can be confined in a scheduled resource (e.g., rather than transmitted on a wideband), and can be transmitted only when necessary. As shown, DMRSs are used for both downlink communications and uplink communications.

A PTRS can carry information used to compensate for oscillator phase noise. In some cases, oscillator phase noise may increase as an oscillator carrier frequency increases. In some examples, a PTRS can be utilized at high carrier frequencies (e.g., such as millimeter wave frequencies) to mitigate oscillator phase noise. The PTRS may be used to track the phase of the local oscillator and to enable suppression of phase noise and common phase error (CPE). As illustrated in FIG. 5, in some examples one or more PTRSs can be used for both downlink communications (e.g., on the PDSCH) and uplink communications (e.g., on the PUSCH).

A PRS may carry information associated with timing or ranging measurements of UE 104. For example, UE 104 may utilize one or more signals (e.g., PRSs) transmitted by base station 102 to improve an observed time difference of arrival (OTDOA) positioning performance. In some examples, a PRS may be a pseudo-random Quadrature Phase Shift Keying (QPSK) sequence mapped in diagonal patterns with shifts in frequency and time to avoid collision with cell-specific reference signals and control channels (e.g., a PDCCH). A PRS can be designed to improve detectability by UE 104, which may need to detect downlink signals from multiple neighboring base stations in order to perform OTDOA-based positioning. Accordingly, UE 104 may receive a PRS from multiple cells (e.g., a reference cell and one or more neighbor cells), and may report a reference signal time difference (RSTD) based on OTDOA measurements associated with the PRSs received from the multiple cells. In some aspects, base station 102 can calculate a position of UE 104 based on the RSTD measurements reported by UE 104.

In some examples, an SRS can carry information used for uplink channel estimation, which may be used for scheduling, link adaptation, precoder selection, and/or beam management, among other examples. Base station 102 can configure one or more SRS resource sets for UE 104, and UE 104 can transmit SRSs on the configured SRS resource sets. An SRS resource set may have a configured usage, such as uplink CSI acquisition, downlink CSI acquisition for reciprocity-based operations, uplink beam management, among other examples. Base station 102 may measure the SRSs, may perform channel estimation based on the measurements, and/or may use the SRS measurements to configure communications with UE 104.

Figure 6:
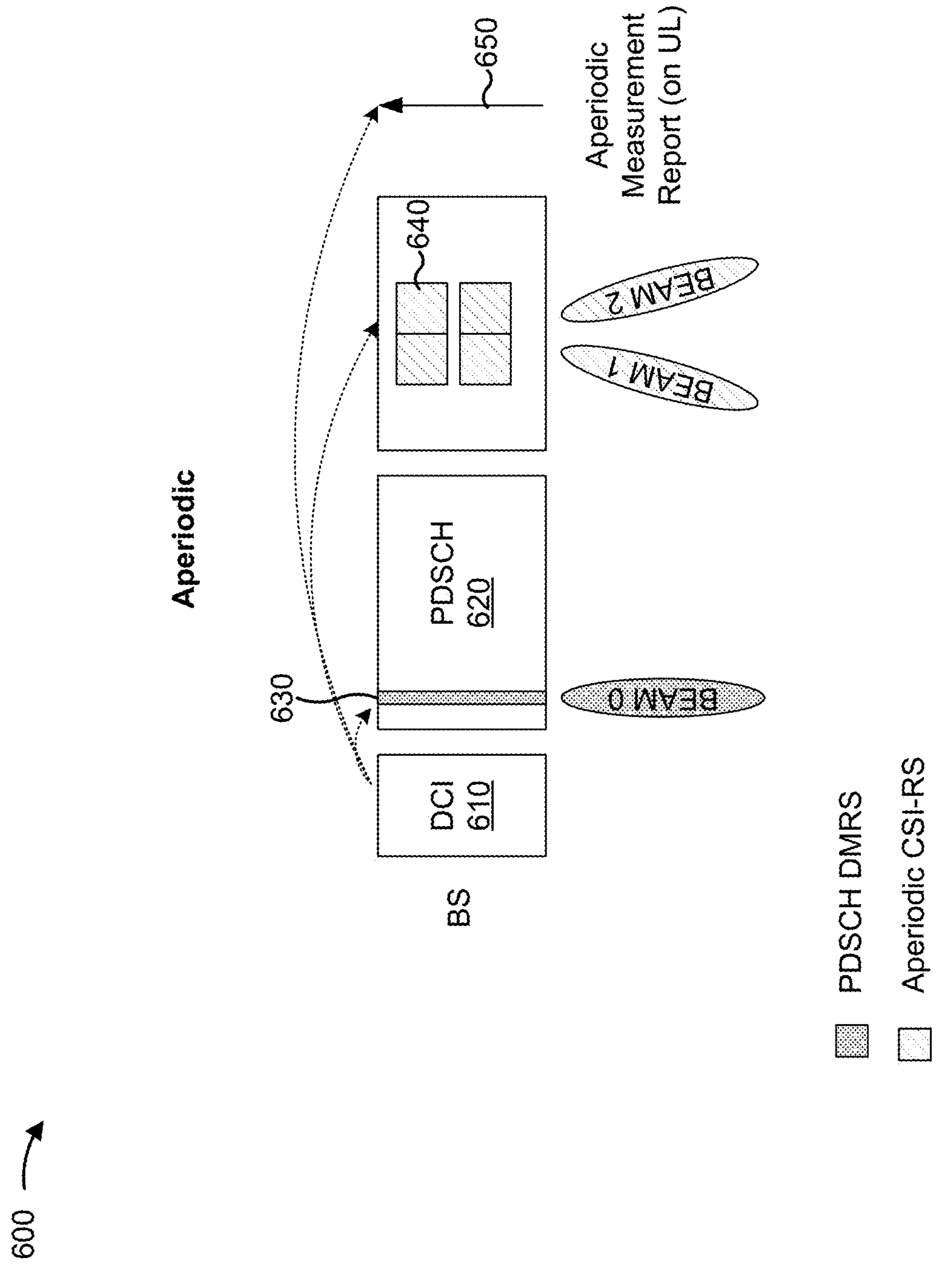
FIG. 6 is a diagram illustrating an example of an aperiodic configuration for a beam management procedure, in accordance with some examples.

FIG. 6 is a diagram illustrating an example of an aperiodic configuration 600 for a beam management procedure based on a DMRS and at least one of a CSI-RS or an SSB. For example, aperiodic configuration 600 can be used to implement or otherwise be associated with a beam management procedure. In some examples, a beam management procedure may be a procedure for selecting and/or refining one or more beams used for communication between two wireless communication devices (e.g., such as a UE and a base station). For example, a UE may perform measurements based on various reference signals (e.g., a DMRS, an SSB, and/or a CSI-RS), and may report information regarding the measurements to a base station. The information regarding the measurements may indicate one or more selected beams, one or more preferred beams, measurement information (e.g., measurement values), etc.

In one illustrative example, the beam management procedure can be a mixed beam management procedure. A mixed beam management procedure can be a beam management procedure that utilizes a plurality of reference signals that include one or more reference signals of a first type and one or more reference signals of second type that is different from the first type. For example, a mixed beam management procedure can utilize a plurality of reference signals that include one or more DMRSs and at least one of an SSB or a CSI-RS.

As illustrated in FIG. 6, a base station (BS) may transmit downlink control information (DCI) 610. The DCI 610 can schedule a PDSCH 620. In some examples, PDSCH 620 can include a DMRS 630 that is transmitted on a beam 0. The DCI 610 may additionally schedule a set of aperiodic CSI-RSs 640 on beams 1 and 2. The DCI 610 can further schedule an aperiodic measurement report 650 on an uplink of a UE (e.g., UE 104, UE 407, etc.). The UE may transmit the measurement report on the uplink. In some aspects, the aperiodic configuration 600 of a mixed beam management procedure can be considered an example of explicit indication of which resources (e.g., SSB resources, CSI-RS resources, DMRS resources) to include in the mixed beam management procedure. In the example of aperiodic configuration 600, the explicit indication can be DCI 510. In some aspects, the explicit indication may be a MAC signal (e.g., such as a MAC control element (CE)).

A receiving device (e.g., a UE, which may be an example of a mmW receiving device) may try multiple receive beams when receiving various signals from a base station (e.g., such as synchronization signals, reference signals, beam selection signals, and/or other control signals). For example, a receiving device may try multiple receive directions by receiving via different antenna subarrays, by processing received signals according to different antenna subarrays, by receiving according to different receive beamforming weight sets applied to signals received at a plurality of antenna elements of an antenna array, and/or by processing received signals according to different receive beamforming weight sets applied to signals received at a plurality of antenna elements of an antenna array (e.g., any of which may be referred to as "listening" according to different receive beams or receive directions). In some examples, a receiving device may use a single receive beam to receive along a single beam direction (e.g., when receiving a data signal). The single receive beam may be aligned in a beam direction determined based on listening according to different receive beam directions (e.g., a beam direction determined to have a highest signal strength, highest signal-to-noise ratio, or otherwise acceptable signal quality based on listening according to multiple beam directions).

In some aspects, an L1 measurement report may be used to send CSI-RS, SSB, or DMRS reference signal received power (RSRP) or signal to interference plus noise (SINR) measurements. For example, the L1 measurement report may be set to be periodic, aperiodic or semi-persistent. In some aspects, up to four CSI-RS resource indicators (CRIs) and/or SSB resource indicators (SSBRI) L1 measurement reports may be transmitted per CSI reporting settings. For example, an L1 measurement report may include seven bits for the strongest measurement(s) and four bits for each of the three remaining measurements (e.g., indicating a differential relative to the strongest measurement). In some aspects, multiple measurement reports (e.g., based on multiple reporting settings) may be sent in a single PUCCH or PUSCH. For example, the number of measurement reports that can be transmitted in a single PUCCH or PUSCH may be limited by the PUCCH/PUSCH payload size. If the payload size is not sufficient, then one or more measurements reports with a lowest priority may be dropped.

Figure 7:
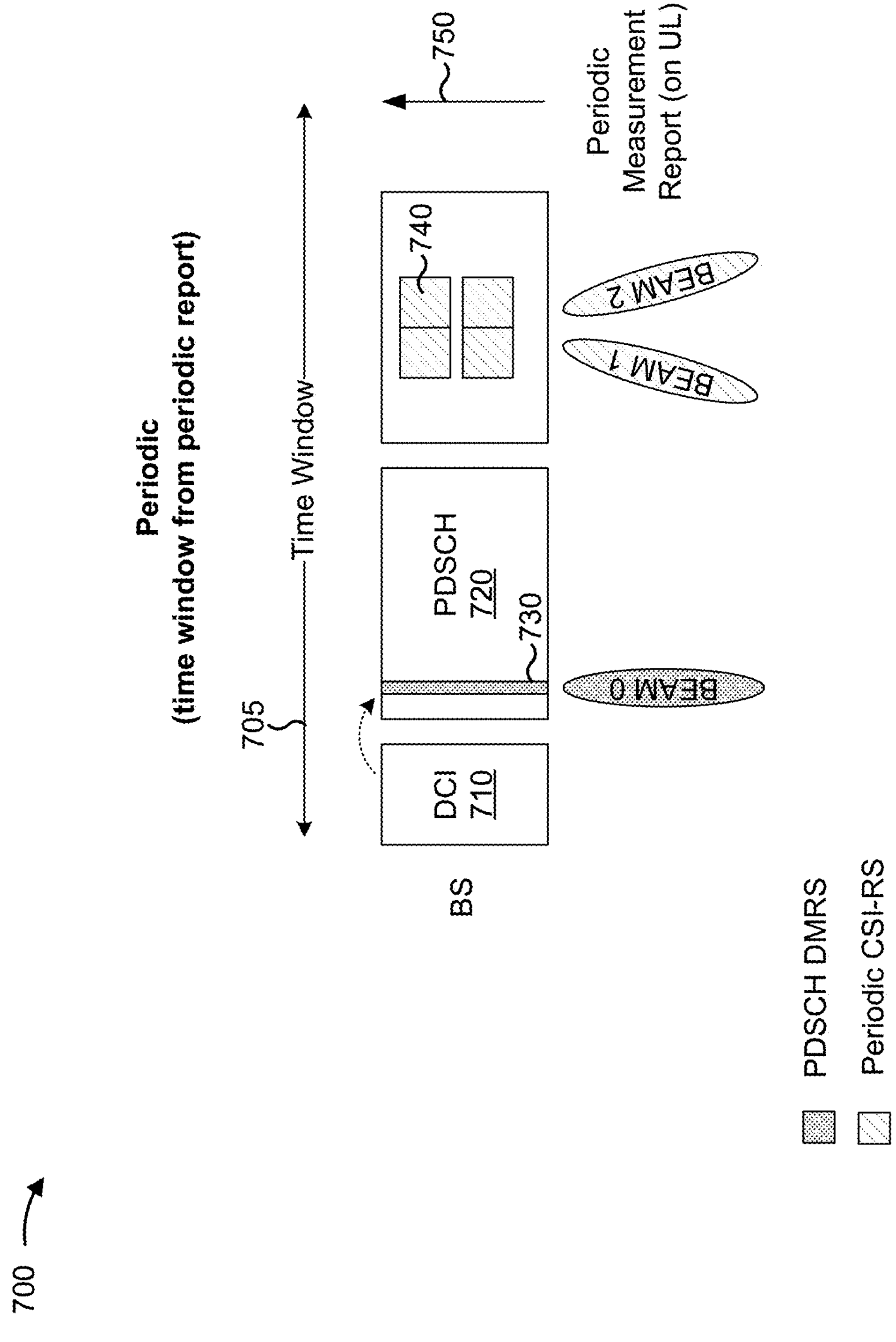
FIG. 7 is a diagram illustrating an example of a time window-based periodic configuration for a beam management procedure, in accordance with some examples.

FIG. 7 is a diagram illustrating an example of a time window-based periodic configuration 700 for a beam management procedure based on at least one DMRS and at least one of a CSI-RS or an SSB. For example, the aperiodic configuration 700 may be used for a mixed beam management procedure. A time window 705 may be measured backward from a time associated with a periodic measurement report 750 transmitted on an uplink (UL) channel associated with a UE. Reference signals included in time window 705 (e.g., received by a UE during time window 705), such as DMRS 730 and periodic CSI-RSs 740, can be used to perform a mixed beam management procedure, as will be described in greater depth below.

A base station (BS) may transmit downlink control information (DCI) 710. The DCI 710 can schedule a PDSCH 720. In some examples, PDSCH 720 can include a DMRS 730 that is transmitted on a beam 0. The DCI 710 may additionally schedule a set of aperiodic CSI-RSs 740 on beams 1 and 2. In some aspects, configuration information may indicate the resources to be used for the beam management procedure based on time window 705. For example, a resource (such as an SSB resource, a CSI-RS resource, or a DMRS resource) that is included in time window 705 may be used for the beam management procedure. In some aspects, a start or end of the time window may correspond to transmission of a measurement report. For example, time window 705 may include a length of time preceding a time at which measurement report 750 is to be transmitted. In some aspects, a start or end of time window 705 may correspond to reception of a grant. For example, time window 705 may include a length of time preceding a time at which DCI 710 (or DCI grant) is received by the UE. A grant is a communication (e.g., DCI 710) that identifies a resource that can be used by a recipient of the grant for communication.

In some aspects, a start or end of time window 705 may correspond to a semi-persistent scheduling (SPS) occasion. For example, time window 705 may include a length of time preceding or following a time at which an SPS transmission is to be performed by the UE or the BS. An SPS occasion is a resource that is configured to be available for a communication by the UE or the BS in a recurring fashion. An SPS allocation can be activated or deactivated. In some aspects, a start or end of time window 705 may correspond to a control resource set (CORESET). For example, time window 705 may include a length of time preceding or following a time associated with the CORESET. In some aspects, a start or end of time window 705 may correspond to reception or transmission of a triggering signal. For example, time window 705 may include a length of time preceding or following a time at which the triggering signal is received by the UE. A triggering signal is a signal that triggers a beam management operation. The triggering signal can include RRC signaling, MAC signaling, DCI, a reference signal, and/or the like.

Figure 8:
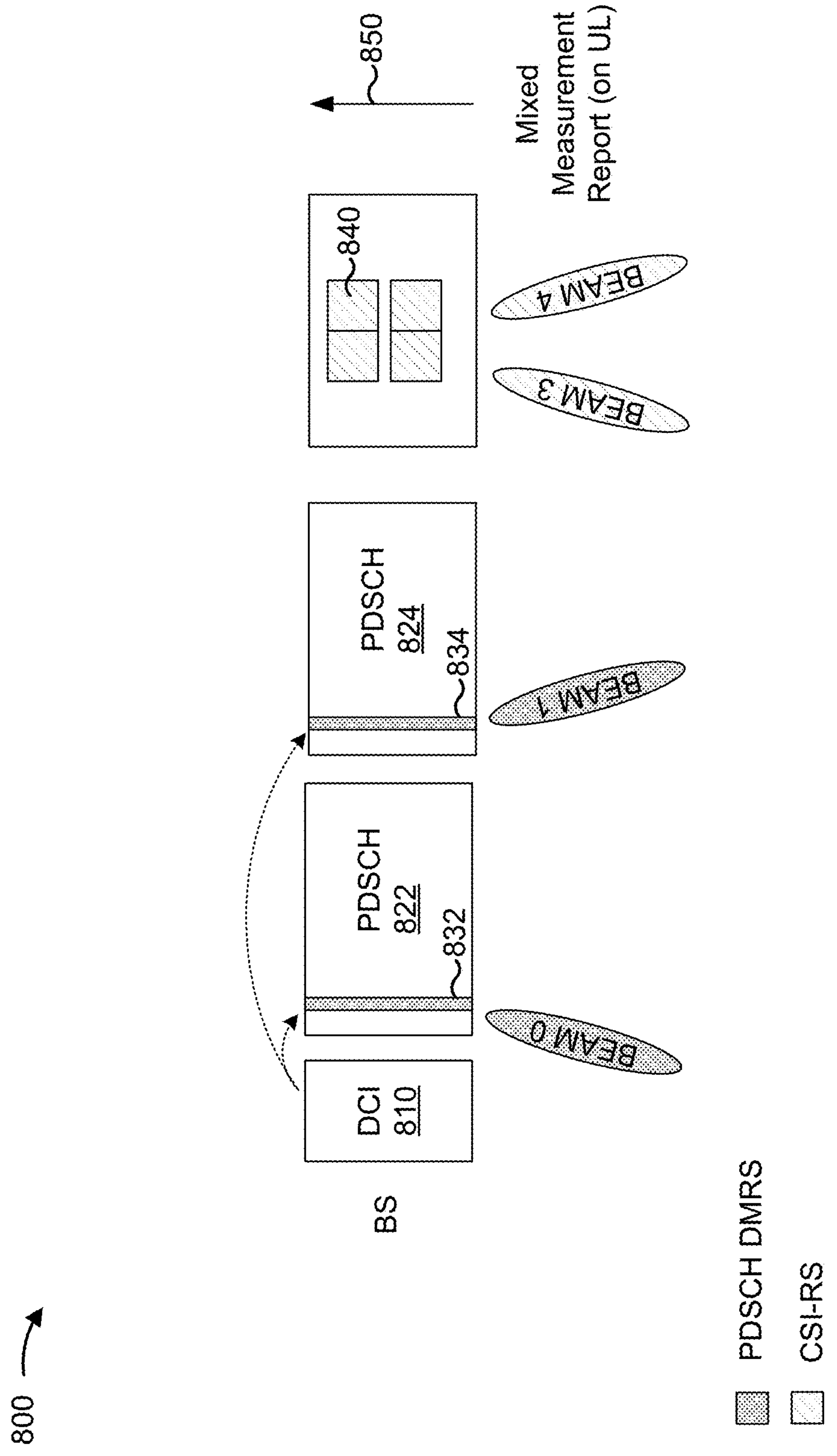
FIG. 8 is a diagram illustrating an example of a configuration for a mixed reference signal beam management procedure, in accordance with some examples.

FIG. 8 is a diagram illustrating an example of a configuration 800 for a mixed reference signal beam management procedure. In some examples, the mixed reference signal beam management procedure can be based on a plurality of reference signals. For example, the plurality of reference signals can include at least a first reference signal of a first type and a second reference signal of a second type different from the first type. In one illustrative example, the first type of reference signal can be a DMRS and the second type of reference signal can be at least one of a CSI-RS or an SSB.

For example, a base station (BS) may transmit downlink control information (DCI) 810. The DCI 810 can schedule a first PDSCH 822 and a second PDSCH 824. In some examples, the first PDSCH 822 can include or otherwise be associated with a first DMRS 832 that is transmitted on a beam 0. The second PDSCH 824 can include or otherwise be associated with a second DMRS 834 that is transmitted on a beam 1. The DCI 810 may additionally schedule a set of CSI-RSs 840 on beams 3 and 4. In some aspects, the DCI 810 can schedule a mixed measurement report 850 on an uplink (UL) channel. In one illustrative example, mixed measurement report 850 can include a combination of DL RS measurement information and feedback information, as will be described in greater depth below.

For example, mixed measurement report 850 can be indicative of a first measurement information associated with DMRSs 832 and 834, a second measurement information associated with CSI-RSs 840, and feedback information indicative of a respective HARQ ACK/NACK for each of DMRSs 832 and 834 (e.g., a HARQ ACK/NACK for each of the PDSCHs 822, 824 associated with the respective DMRSs 832, 834). In some aspects, the first and second measurement information (e.g., associated with the multiple DL RS instances including DMRSs 832, 834 and CSI-RSs 840) may also be referred to herein as beam information or mixed beam information.

In one illustrative example, mixed measurement report 850 can be an L1 measurement report that also includes respective HARQ ACK/NACK feedback information. For example, HARQ ACK/NACK feedback information associated with the PDSCHs 822, 824 used to transmit the DMRSs 832, 834 can be included in (e.g., piggybacked on) an L1 measurement report.

Figure 9:
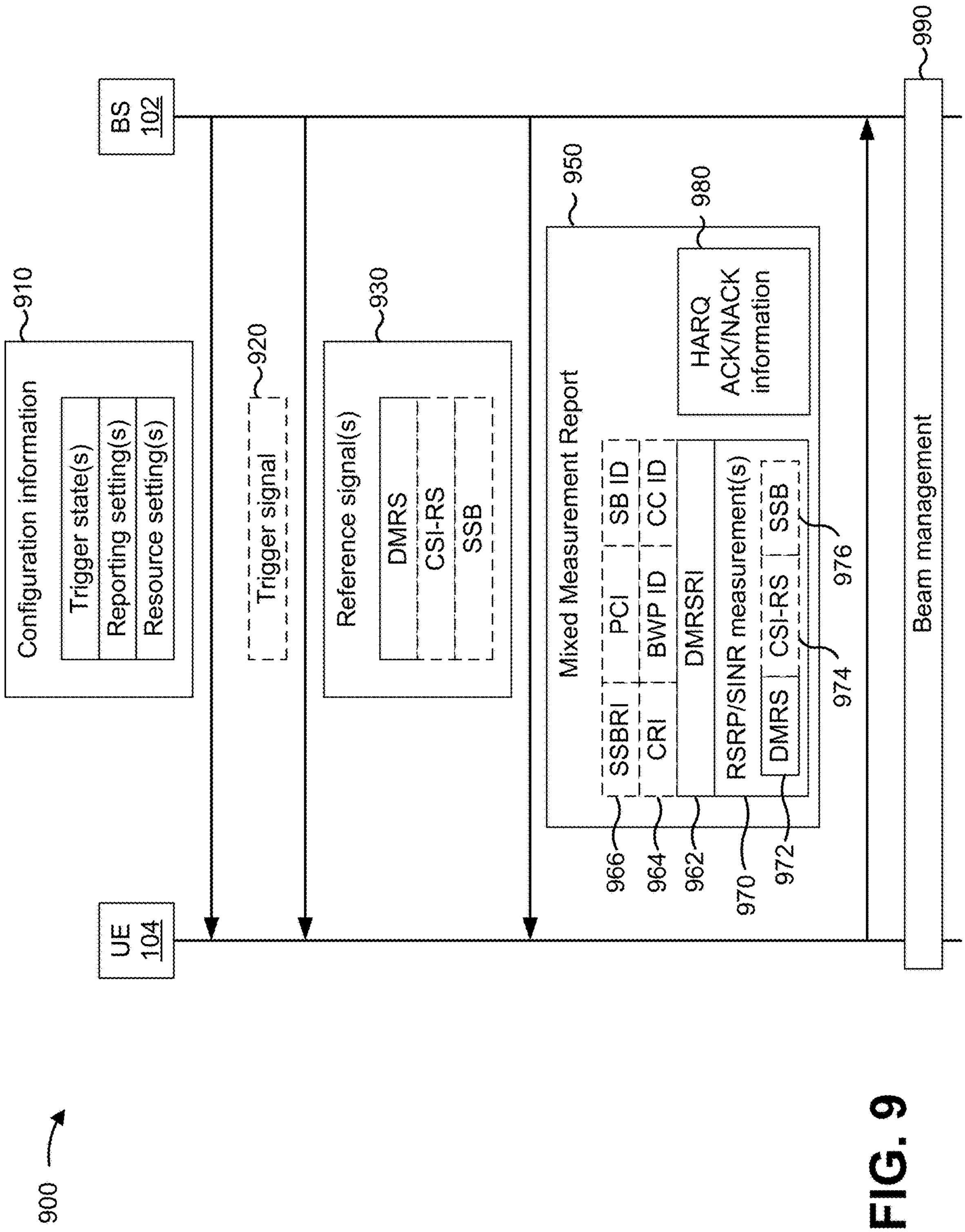
FIG. 9 is a diagram illustrating an example of signaling associated with a mixed reference signal measurement report, in accordance with some examples.

For example, FIG. 9 is a diagram illustrating an example 900 of signaling associated with L1 measurement reporting of a DMRS based measurement, wherein the L1 measurement reporting further includes feedback information associated with the DMRS based measurement. In some aspects, a measurement report that includes L1 measurement reporting information and feedback information may also be referred to as a "mixed measurement report" or an "L1 mixed measurement report." In some examples, the feedback information may be HARQ feedback information 980 (e.g., HARQ ACK/NACK) that is included in or piggybacked on an L1 measurement report 950.

As illustrated, FIG. 9 includes a UE 104 and a BS 102 that can be used to perform a beam management procedure. For example, the beam management procedure can be the same as or similar to one or more of the beam management procedures illustrated in and described above with respect to FIGS. 6-8. In some aspects, dashed boxes illustrated in FIG. 9 may indicate optional operations.

In some examples, BS 102 may transmit configuration information 910 to UE 104. Configuration information 910 can indicate a configuration for mixed L1 measurement reporting based on a DMRS. In some aspects, configuration information 910 may include one or more radio resource control (RRC) parameters (e.g., trigger states, reporting settings, resource settings, etc.). In some aspects, configuration information 910 may indicate how UE 104 is to determine a DMRS-based CSI measurement and report the DMRS-based CSI measurement in a mixed measurement report 950.

In some aspects, configuration information 910 can indicate that a DMRS-based measurement (e.g., an RSRP measurement and/or an SINR measurement) and another measurement (e.g., an RSRP measurement and/or an SINR measurement based on a CSI-RS and/or an SSB) are to be included in mixed measurement report 950. For example, for aperiodic CSI, each CSI trigger state may be associated with one or more CSI reporting settings. Each CSI reporting setting may be linked to one or more periodic, semi-persistent, or aperiodic resource settings. For periodic or semi-persistent CSI, each CSI reporting setting may be linked to one or more periodic or semi-persistent resource settings. In some aspects, configuration information 910 may indicate one or more DMRSs to be included in mixed measurement report 950. For aperiodic CSI, a trigger state (e.g., each trigger state) configured using a CSI trigger state parameter may be associated with one or more CSI reporting settings. Each CSI reporting setting may be linked to one or more DMRSs through an explicit indication in a triggering signal (e.g., a triggering message). For example, a trigger signal 920 may include RRC signaling, MAC signaling, DCI, a physical layer signal, etc. In some examples, each CSI reporting setting may be linked to one or more DMRSs based on one or more rules (e.g., such as a predefined rule). The one or more rules may be configured via higher-layer signaling (e.g., such as RRC signaling). For example, the one or more rules may be configured as part of the configuration information 910 and/or via other RRC signaling.

In some aspects, a rule (e.g., of the one or more rules) can be based on a time reference. For example, the time reference may be a mixed L1 measurement report, a grant, an SPS occasion, a CORESET, a trigger signal (e.g., trigger signal 920), etc. In some aspects, the rule may indicate that N DMRS symbols before and/or after a time reference are to be used for mixed measurement report 950. In some aspects, the rule may indicate that DMRS symbols included in N slots or mini-slots before and/or after a time reference are to be used for mixed measurement report 950. The parameter N can be signaled in configuration information 910 or can be signaled separately. In some aspects, a slot may include a set number of OFDM symbols (e.g., 14 for normal cyclic prefix or 12 for extended cyclic prefix). A mini-slot can be a group of two, four, or seven OFDM symbols, and can be positioned asynchronously with the start of a slot. In some aspects, a time period (e.g., a slot or a mini-slot) may include a plurality of DMRSs.

In some aspects, if the time period includes a plurality of DMRSs (e.g., as illustrated in FIG. 8), UE 104 may use (e.g., include in mixed measurement report 950) an average measurement, a best measurement, and/or a worst measurement associated with the plurality of DMRSs. A best measurement can be a measurement with a highest SINR or a highest RSRP, and a worst measurement can be a measurement with a lowest SINR or a lowest RSRP.

For example, as illustrated in FIG. 9, mixed measurement report 950 can include one or more RSRP/SINR measurements 970 (e.g., or indications thereof) that are associated with a plurality of reference signals received by UE 104. In some examples, the RSRP/SINR measurements 970 can include one or more DMRS measurements 972 (e.g., or indications thereof), one or more CSI-RS measurements 974 (e.g., or indications thereof), and/or one or more SSB measurements 976 (e.g., or indications thereof). In some aspects, a resource setting of configuration information 910 may indicate DMRSs for which measurements (e.g., DMRS measurements 972) are to be included in mixed L1 measurement report 950. For example, a resource setting may be defined for DMRSs, and may indicate any one or combination of the above-described rules.

As described above, in some examples BS 102 may transmit a trigger signal 920. The trigger signal 920 can cause UE 104 to determine measurements 970 for a set of reference signals 930 (e.g., based on configuration information 910). In some aspects, BS 102 may not trigger the determination of measurements 970. For example, UE 104 may determine measurements 970 based on a periodic configuration (e.g., such as the periodic configuration illustrated in FIG. 7).

The BS 102 may transmit a set of reference signals 930 (e.g., a plurality of reference signals) to UE 104. The set of reference signals 930 may include one or more DMRSs, which may be transmitted on a set of beams. In some aspects, the set of reference signals 930 may include one or more CSI-RSs and/or one or more SSBs. In some examples, BS 102 can transmit the set of reference signals 930 based on configuration information 910. For example, BS 102 may transmit the set of reference signals 930 via a set of resources indicated by configuration information 910.

UE 104 can generate and transmit a mixed measurement report 950. The mixed measurement report 950 may be based on the set of reference signals 930 and/or may be based on configuration information 910. In some examples, UE 104 can determine (e.g., perform) a set of measurements on the set of reference signals 930 as indicated by configuration information 910, and may transmit (e.g., in mixed measurement report 950) information 970 indicative of the set reference signal measurements. In some examples, mixed measurement report 950 may include one or more measurements 972 (e.g., an RSRP measurement and/or an SINR measurement) based on a corresponding one or more DMRSs. In some examples, mixed measurement report 950 can further include one or more measurements 974 based on a corresponding one or more CSI-RSs and/or can include one or more measurements 976 based on a corresponding one or more SSBs.

The mixed measurement report 950 may include a DMRS resource indicator (DMRSRI) 962. For example, a DMRSRI (e.g., such as DMRSI 962) may indicate a DMRS for which a measurement (e.g., DMRS measurements 972) is reported. In some aspects, DMRSRI 962 may be based on a quasi-colocated resource indicator (e.g., a quasi-colocated SSBRI or a quasi-colocated CRI). In some examples, a DMRS may be quasi-colocated with a source signal, which may be an SSB or a CSI-RS.

In some aspects, DMRSRI 962 can be based on a pre-configured indicator. For example, DMRSRI 962 may map a DMRS to a time relative to a time reference (e.g., a first index for a DMRS closest in time to mixed measurement report 950; a second index for a DMRS second closest in time to mixed measurement report 950; etc.). In some examples, DMRSRI 962 may indicate a DMRS resource based on a layer identifier, a port identifier, and/or a TCI state associated with the DMRS resource.

In some aspects, DMRSRI 962 may indicate a DMRS resource associated with an average measurement. For example, the average measurement may be determined as an average of a plurality of DMRS measurements 972 measured for a respective plurality of DMRS resources (e.g., across ports, across layers, across TRPs, etc.). In some examples, DMRSRI 962 may indicate the multiple DMRS resources used to determine an average measurement.

In some aspects, a mixed measurement report can further indicate one or more of: a physical cell identifier (PCI) associated with a DMRS corresponding to a DMRS measurement 972 included in the measurement report, a CRI 964 associated with a CSI-RS corresponding to a CSI-RS measurement 974 included in the measurement report, and/or an SSBRI 966 associated with an SSB corresponding to an SSB measurement 976 included in the measurement report. In some examples, a mixed measurement report can additionally, or alternatively, further indicate one or more of: a component carrier identifier (CC ID) indicating a component carrier in which a DMRS was transmitted, a bandwidth part identifier (BWP ID) indicating a bandwidth part in which a DMRS was transmitted, and/or a subband identifier (SB ID) indicating a subband in which a DMRS was transmitted.

In some aspects, mixed measurement report 950 may indicate a group of measurements 970 (e.g., a plurality of measurements associated with a respective plurality of reference signals 930 received or measured by UE 104). For example, mixed measurement report 950 may indicate a plurality of measurements which are grouped into one or more groups. A group of measurements may be based on, for example, reference signals transmitted by a same TRP, all CSI-RS measurements, all DMRS measurements, all reference signals in the same subband, all measurements associated with a particular reporting setting, etc. In some aspects, a group of measurements may be indicated by absolute values of each measurement.

In some examples, mixed measurement report 950 may indicate a measurement for a particular measurement of a group of measurements (e.g., a best measurement, a strongest measurement, etc.), and may indicate one or more differential values that identify one or more remaining measurements of the group of measurements. For example, mixed measurement report 950 can include or indicate a measurement value for a best or strongest DMRS measurement, and can include or indicate differential values (e.g., relative to the best DMRS measurement) for any remaining DMRS measurements included in the group of DMRS measurements 972. In some aspects, the group of measurements may be based on reference signals associated with the same quasi-colocation source (e.g., an SSB). In such a case, mixed measurement report 950 may indicate an absolute value for the quasi-colocation source and one or more differential values for one or more remaining measurements of the group of measurements.

In some aspects, UE 104 and BS 102 may perform beam management 990 (e.g., mixed beam management) based on the mixed measurement report 950. For example, BS 102 may configure a communication with UE 104 based on mixed measurement report 950. In some examples, BS 102 and/or UE 104 can select one or more beams based on the mixed measurement report 950. In some cases, BS 102 can trigger further measurement by UE 104 based on mixed measurement report 950.

In one illustrative example, the systems and techniques described herein can be used to generate a measurement report that includes mixed beam information (e.g., RSRP and/or SINR measurements, or indications thereof) for a plurality of reference signals and includes feedback information associated with receiving at least a portion of the plurality of reference signals. For example, a single measurement report can be generated to include both the mixed beam information and the feedback information. In some aspects, the mixed beam information can include measurement information for one or more DMRSs and measurement information for one or more CSI-RSs, SSBs, or other reference signal types. The feedback information can be HARQ feedback information (e.g., ACK/NACK) associated with receiving and decoding a PDSCH associated with each of the one or more DMRSs.

As mentioned previously, in some examples the systems and techniques can generate the single, mixed measurement report based on combining or piggybacking HARQ feedback information on a L1 measurement report. For example, as illustrated in FIG. 9, HARQ feedback (e.g., HARQ ACK/NACK) information 980 can be included in mixed L1 measurement report 950. HARQ feedback information 980 can include either a HARQ ACK or a HARQ NACK for each respective DMRS associated with the DMRS information 972. For example, if mixed L1 measurement report 950 is generated based on UE 104 measuring a first and second DMRS (e.g., DMRSs 832, 834 illustrated in FIG. 8), HARQ feedback information 980 can include a respective first and second HARQ ACK/NACK. The first HARQ ACK/NACK is associated with UE 104 receiving and decoding the first PDSCH 822 (e.g., which is associated with first DMRS 832), wherein a HARQ ACK can indicate that first PDSCH 822 was successfully received and decoded while a HARQ NACK can indicate that the first PDSCH 822 was unsuccessfully received or was unsuccessfully decoded. Similarly, the second HARQ ACK/NACK described in the example above is associated with UE 104 receiving and decoding the second PDSCH 824 (e.g., which is associated with second DMRS 834).

In some examples, the systems and techniques can generate a mixed measurement report that includes beam information and explicit HARQ feedback information. For example, FIG. 10 is a diagram illustrating an example mixed measurement report 1050 that includes measurement information 1070 and HARQ feedback information 1080. In some aspects, the example mixed measurement report 1050 can be the same as or similar to the mixed measurement report 950 illustrated in FIG. 9.

In some examples, mixed measurement report 1050 can include beam information and explicit HARQ feedback information. For example, mixed measurement report 1050 can include beam measurement information 1070 and HARQ feedback (e.g., ACK/NACK) information 1080. In some aspects, each respective entry included in beam measurement information 1070 and HARQ feedback information 1080 can be associated with a reference signal (RS) that is identified by a reference signal identifier (RS ID) 1060.

In one illustrative example, mixed measurement report 1050 can be generated based on the example reference signal beam configuration 800 illustrated in FIG. 8. For example, mixed measurement report 1050 can be generated based on a beam 0 and beam 1 that are associated with respective DMRSs and a beam 1 and beam 2 that are associated with respective CSI-RSs. The DMRS associated with beam 0 can be identified by a first DMRSI included in RS ID 1060 and the DMRS associated with beam 1 can be identified by a second DMRSI included in RS ID 1060. In some examples, the DMRS beam 0 and/or DMRS beam 1 associated with mixed measurement report 1050 can be the same as or similar to the DMRS beam 0 and DMRS beam 1 illustrated in FIG. 8. In some aspects, the CSI-RS associated with beam 2 can be identified by a first CRI included in RS ID 1060 and the CSI-RS associated with beam 3 can be identified by a second CRI included in RS ID 1060. In some examples, the CSI-RS beam 2 and/or CSI-RS beam 3 associated with mixed measurement report 1050 can be the same as or similar to the CSI-RS beam 2 and CSI-RS beam 3 illustrated in FIG. 8.

In some examples, the beam measurement information 1070 can include a measurement value or measurement information for each beam identified by the respective entries of the RS ID listing (e.g., column) 1060. For example, the beam measurement information 1070 associated with DMRS beam 0 can be an RSRP/SINR value that was measured for DMRS beam 0 (e.g., measure at or by UE 104). The beam measurement information 1070 associated with DMRS beam 1 can be a differential value between the RSRP/SINR value measured for DMRS beam 0 and the RSRP/SINR value measured for DMRS beam 1. Similarly, the beam measurement information associated with CSI-RS beams 2 and 3 can both be differential values relative to the RSRP/SINR value that was measured for DMRS beam 0. In some aspects, mixed measurement report 1050 can include beam measurement information 1070 that includes one measured RSRP/SINR value, with the remaining entries included in beam measurement information 1070 representing differential values calculated relative to the measured RSRP/SINR value. In one illustrative example, the one measured RSRP/SINR value included in beam information 1070 can be the measured RSRP/SINR value (e.g., out of all of the RSRP/SINR values measured for the plurality of reference signals indicated in the mixed measurement report 1050) having the largest absolute value.

As illustrated, mixed measurement report 1050 additionally includes HARQ feedback information 1080. In one illustrative example, each HARQ ACK or NACK included in HARQ feedback information 1080 can be associated with a corresponding reference signal identifier included in the RS ID listing 1060. For example, recalling that HARQ ACKs/NACKs may be generated for DMRSs (e.g., which are associated with or scheduled by a PDSCH), in some examples each HARQ ACK or NACK included in HARQ feedback information 1080 can be associated with a corresponding DMRSRI included in RS ID listing 1060. For example, the HARQ feedback information 1080 included in mixed measurement report 1050 does not include HARQ feedback information 1080 for either CSI-RS beam 2 or CSI-RS beam 3, because neither CSI-RS beam is associated with a PDSCH for which a HARQ ACK/NACK would be generated.

In some aspects, HARQ feedback information 1080 can include one or more entries, wherein each entry is N-bits. For example, for N=1 (e.g., a single bit), a HARQ ACK can be represented as '0' and a HARQ NACK can be represented as a '1'. In some examples, a HARQ ACK can be represented as a '1' and a HARQ NACK can be represented as a '0'. In some cases, mixed measurement report 1050 can include HARQ feedback information 1080 wherein the HARQ feedback entries are N-bits and N>1. For example, for HARQ feedback information 1080 that includes multi-bit entries (e.g., N>1), one bit of the multi-bit entry can represent (e.g., encode) a HARQ ACK or NACK (e.g., as described above) and the remaining bits of the multi-bit entry can represent (e.g., encode) additional HARQ feedback information. For example, remaining bits of a multi-bit entry can encode additional feedback information (e.g., other than a HARQ ACK or NACK) that can be included in existing HARQ codebooks.

In some examples, the systems and techniques can generate a mixed measurement report that includes beam information and implicitly includes HARQ feedback information. For example, a HARQ ACK can be implicitly signaled for a given DMRS (e.g., and/or the PDSCH associated with the given DMRS) based on including beam information for the given DMRS in the mixed measurement report. A HARQ NACK can be implicitly signaled for a given DMRS (e.g., and/or the PDSCH associated with the given DMRS) based on not including beam information for the given DMRS in the mixed measurement report.

FIG. 11 is a diagram illustrating an example mixed measurement report 1150 that includes measurement information 1170 and that includes implicitly signaled HARQ feedback information 1180. In some aspects, mixed measurement report 1150 can be generated based on the same DMRS beams 0 and 1 and CSI-RS beams 2 and 3 as mixed measurement report 1050 (e.g., as described above with respect to FIG. 10). In some examples, mixed measurement report 1150 can be generated based on the example reference signal beam configuration 800 illustrated in FIG. 8.

In some examples, the RS ID listing 1160 illustrated in FIG. 11 can be the same as or similar to the RS ID listing 1060 illustrated in FIG. 10 and described above. In some examples, the measurement information 1170 included in mixed measurement report 1150 can be the same as or similar to the measurement information 1070 included in measurement report 1050. For example, measurement information 1170 can include a measured RSRP/SINR value for DMRS beam 0 (e.g., based on DMRS beam 0 having the measured RSRP/SINR value with the greatest absolute magnitude out of the four measurements associated with mixed measurement report 1150) and a differential value for the remaining DMRS beam 1 and CSI-RS beams 2 and 3 (e.g., differential value relative to the measured RSRP/SINR value f or DMRS beam 0).

In one illustrative example, mixed measurement report 1150 can include HARQ feedback information (e.g., HARQ ACKs and/or NACKs) that are signaled implicitly (e.g., rather than included explicitly in the report, as with HARQ feedback information 1080 that is explicitly included or signaled in mixed measurement report 1050 illustrated in FIG. 10). In some cases, a HARQ ACK (e.g., ACK 1182 and/or ACK 1184) can be implicitly signaled for a given entry in the RS ID listing 1160 based on including measurement information 1170 associated with the same given entry in RS ID listing 1160. In some aspects, a HARQ ACK (e.g., ACK 1182 and/or ACK 1184) can be implicitly signaled for a given DMRSI included in RS ID listing 1160 based on including measurement information 1170 associated with the same given DMRSI (e.g., because HARQ ACKs/NACKs may not be generated for reference signals other than DMRSs).

For example, mixed measurement report 1150 is depicted as including a measurement information 1170 associated with DMRS beam 0 (e.g., the actual RSRP/SINR measurement value for DMRS beam 0) and including a measurement information 1170 associated with DMRS beam 1 (e.g., the differential value between the RSRP/SINR measurement value for DMRS beam 0 and the (smaller) RSRP/SINR measurement value for DMRS beam 1). Based on including measurement information 1170 for both DMRS beam 0 and DMRS beam 1, mixed measurement report 1150 may implicitly signal a HARQ ACK for both DMRS beam 0 and DMRS beam 1.

In some examples, a HARQ NACK can be implicitly signaled for a given DMRSI included in RS ID listing 1160 based on excluding (e.g., not including) measurement information 1170 associated with the given DMRSI. For example, mixed measurement report 1150 could be generated to implicitly signal or indicate a HARQ NACK for the DMRSI associated with DMRS beam 1 by removing (e.g., excluding or not including) the measurement information 1170 for DMRS beam 1 from the mixed measurement report 1150. In such an example, mixed measurement report 1150 can include measurement information 1170 for DMRS beam 0 but not for DMRS beam 1. Based on receiving such a mixed measurement report, BS 102 can determine that a HARQ ACK has been signaled for DMRS beam 0 (e.g., which is associated with measurement information 1170 in the mixed measurement report) and can determine that a HARQ NACK has been signaled for DMRS beam 1 (e.g., which is not associated with any measurement information 1170 in the mixed measurement report). In one illustrative example, based on the presence of a measurement information 1170 associated with a given DMRSI and/or DMRS beam, mixed measurement report 1150 can implicitly signal a HARQ ACK for the given DMRSI and/or DMRS beam. Based on the lack of any measurement information 1170 associated with a given DMRSI and/or DMRS beam, mixed measurement report 1150 can implicitly signal a HARQ NACK for the given DMRSI and/or DMRS beam.

In some aspects, implicit HARQ feedback information can be implicitly signaled based on a pre-determined threshold. For example, the pre-determined threshold can be signaled to a UE (e.g., UE 104) by a base station (e.g., BS 102). In some examples, the pre-determined threshold can be configured in or for a UE (e.g., UE 104) by a base station (e.g., BS 102). For example, implicit HARQ feedback information may be transmitted based on a determination that a corresponding DMRS measurement (e.g., the DMRS RSRP/SINR value associated with the PDSCH for which the HARQ feedback information is transmitted) is greater than the pre-determined threshold.

In another aspect, the systems and techniques described herein can be used to generate a mixed measurement report based on combining beam information with the HARQ feedback information 980. For example, a set of HARQ ACKs/NACKs (e.g., also referred to as HARQ feedback information or simply HARQ ACKs) can be transmitted in a HARQ codebook or other feedback report that includes a plurality of HARQ ACKs. In some aspects, each HARQ ACK can be associated (e.g., in the mixed measurement report) with an identifier of the associated DMRS to which the HARQ ACK corresponds. For example, the identifier can be a DMRSI (e.g., such as DMRSI 962). In one illustrative example, HARQ feedback information can be used to encode beam information for one or more reference signal beams (e.g., DMRS beams).

For example, HARQ feedback information can be generated to order the individual HARQ ACKs based on the corresponding DMRS measurement (e.g., DMRS measurement 972) associated with each respective HARQ ACK. For example, HARQ feedback information can be generated to implicitly include DMRS beam information based on the ordering of the HARQ ACKs (e.g., and the associated DMRSIs). In some cases, the HARQ feedback information can be included in a HARQ codebook that includes the HARQ ACKs in order of the best to worst DMRS measurement (e.g., best DMRS RSRP/SINR to worst DMRS RSRP/SINR). As mentioned previously, in some aspects, beam management may be performed based on selecting a best or optimal beam to use for transmission between UE 104 and BS 102. Based on the DMRS beam information implicitly included in the ordering of the respective HARQ ACKs in the HARQ codebook (e.g., generated in response to receiving the PDSCHs associated with the DMRSs), BS 102 can determine or identify the best DMRS beam for UE 104 (e.g., best RSRP/SINR) based on the DMRSI associated with the first HARQ ACK entry included in the ordered HARQ codebook (e.g., or othered ordered HARQ feedback information).

Figure 12:
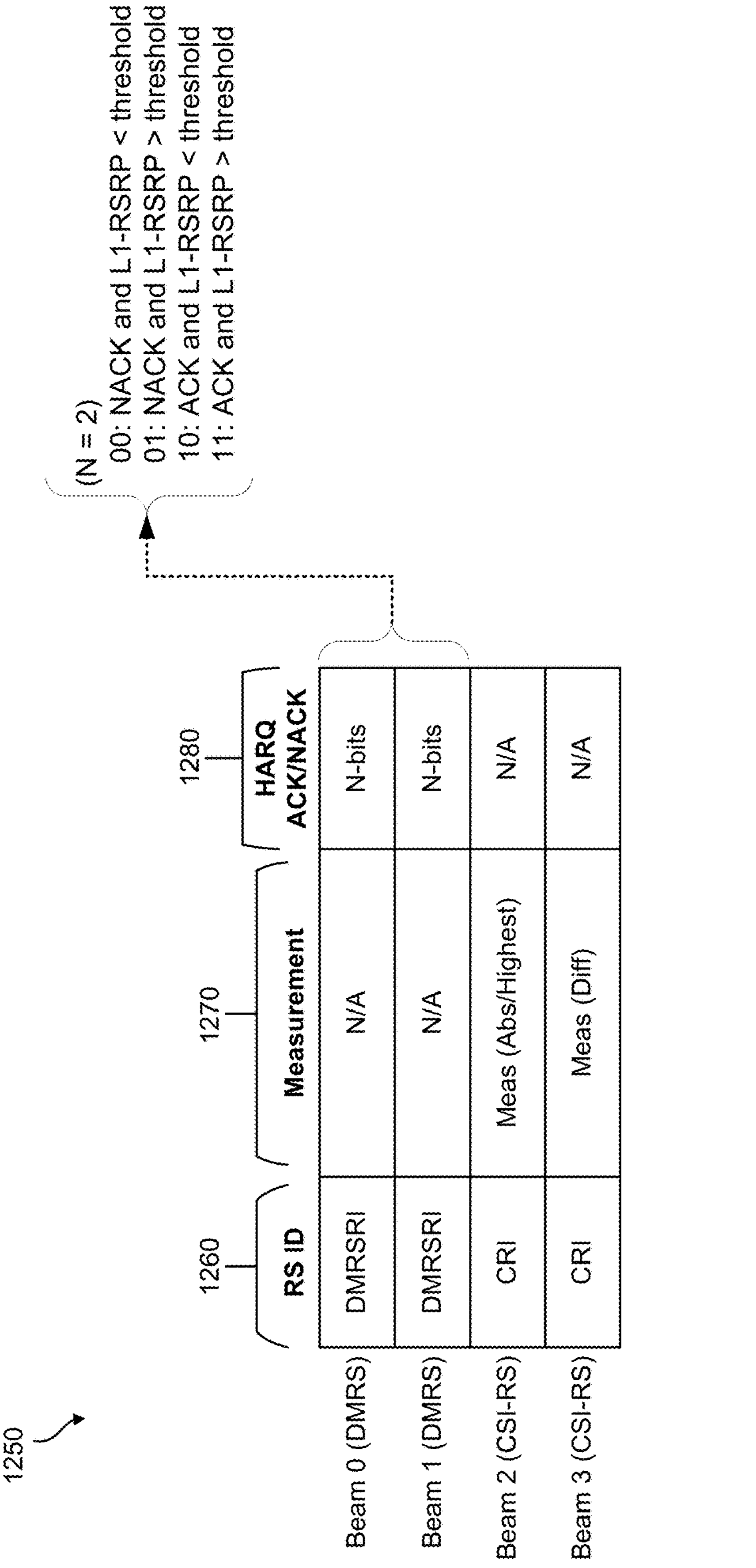
FIG. 12 is a diagram illustrating an example of a mixed reference signal measurement report including measurement information and feedback information, in accordance with some examples.

In some aspects, HARQ feedback information can explicitly include or encode beam information. For example, a HARQ feedback information may represent a HARQ ACK/NACK using a single bit. Based on extending the HARQ feedback information to include multiple bits, a HARQ ACK/NACK can be encoded on one bit of the multiple bits and beam information (e.g., associated with the same DMRSI and/or DMRS beam as the HARQ ACK/NACK) can be encoded on one or more remaining bits of the multiple bits. In one illustrative example, the systems and techniques described herein can generate a mixed measurement report that includes HARQ feedback information that encodes beam information. For example, FIG. 12 is a diagram illustrating an example mixed measurement report 1250 that includes measurement information 1270 and multi-bit HARQ feedback information 1280. In some aspects, mixed measurement report 1250 can be generated based on the same DMRS beams 0 and 1 and CSI-RS beams 2 and 3 as mixed measurement report 1150 (e.g., as described above with respect to FIG. 11) and/or as mixed measurement report 1050 (e.g., as described above with respect to FIG. 10). In some examples, mixed measurement report 1250 can be generated based on the example reference signal beam configuration 800 illustrated in FIG. 8.

In some examples, the RS ID listing 1260 illustrated in FIG. 12 can be the same as or similar to the RS ID listing 1160 illustrated in FIG. 11 and/or can be the same as or similar to the RS ID listing 1060 illustrated in FIG. 10 (e.g., both as described above). In some examples, the measurement information 1270 includes measurement information entries for CSI-RS beam 2 and CSI-RS beam 3 but does not include measurement information entries for DMRS beam 0 and DMRS beam 1. As illustrated, measurement information 1270 can include an actual RSRP/SINR measurement value for the non-DRMS reference signal that has the RSRP/SINR with the greatest (e.g., largest) absolute value, with measurement information 1270 including differential RSRP/SINR measurement values for the remaining non-DMRS reference signals (e.g., differential values relative to the largest absolute value non-DMRS reference signal). In some cases, mixed measurement report 1250 can be generated to include measurement information 1270 only for reference signals that are non-DMRS reference signals (e.g., CSI-RS, SSB, etc.). For example, measurement information 1270 may not include measurement information (e.g., absolute or differential values) for DMRS beams based on the measurement information for the DMRS beams instead being encoded in the multi-bit HARQ feedback information 1280.

In one illustrative example, mixed measurement report 1250 can encode measurement information for DMRS beams (e.g., DMRS beam 0 and DMRS beam 1) using one or more bits of the multi-bit HARQ feedback information entries 1280. For example, the multi-bit HARQ feedback information entries can each have N-bits, with N>1. At least one bit of the N-bits can be used to encode or indicate either a HARQ ACK or a HARQ NACK for the corresponding or associated DMRSI included in the RS ID listing 1260. The remaining one or more bits of the N-bits can be used to encode beam information for the same DMRSI (e.g., the N-bit HARQ feedback information 1280 can jointly encode HARQ ACKs/NACKs and measurement information for a given DMRS beam and/or DMRSI).

For example, as illustrated in FIG. 12 for the example of N=2 (e.g., each HARQ feedback entry is 2 bits), a value of '00' can represent a HARQ NACK and an L1-RSRP measurement value that is less than a pre-determined threshold; a value of '01' can represent a HARQ NACK and an L1-RSRP measurement value that is greater than or equal to the pre-determined threshold; a value of '10' can represent a HARQ ACK and an L1-RSRP measurement value that is less than the pre-determined threshold; and a value of '11' can represent a HARQ ACK and an L1-RSRP measurement value that is greater than or equal to the pre-determined threshold.

In some aspects, the pre-determined threshold can be signaled or otherwise configured by BS 102. For example, the pre-determined threshold associated with encoding DMRS L1-RSRP measurement information on the multi-bit HARQ feedback 1280 can be signaled or otherwise configured by BS 102 using the configuration information 910 illustrated in FIG. 9. In some examples, various other joint encoding schemes different than the example described above may be utilized to generate the multi-bit HARQ feedback information 1280. For example, a '1' could represent a HARQ ACK and a '0' could represent a HARQ NACK and/or the first bit position could represent the L1-RSRP measurement information compared to the pre-determined threshold and the second bit position could represent the HARQ ACK/NACK. In some aspects, more than 2 bits can be used to jointly encode a HARQ ACK/NACK and L1-RSRP measurement information for a given DMRS beam and/or DMRSI. For example, two or more bits could be used to encode a HARQ ACK/NACK and additional HARQ feedback information. Additionally, or alternatively, two or more bits could be used to encode L1-RSRP measurement information (e.g., a full measurement value could be encoded, additional measurement information could be encoded, information comparing the L1-RSRP measurement value to multiple pre-determined thresholds could be encoded, differential RSRP measurement values can be encoded, etc.).

In some aspects, a transmission time of the mixed beam information report can be based on one or more (or all) of a type of the mixed beam information report, one or more UE capabilities, and/or subcarrier spacing (SCS) information, etc. For example, a pre-determined encoding scheme can be used to signal the type of the mixed beam information report, one or more UE capabilities, and/or SCS information from UE 104 to BS 102. In some examples, different types of additional information (e.g., such as those listed above) can be encoded based on UE 104 transmitting the mixed beam information report at a specific time interval value relative to the time that UE 104 received the one or more reference signals for which the mixed beam information report was generated. In some examples, different types of additional information (e.g., such as those listed above) can be encoded based on UE 104 transmitted the mixed beam information report within a particular time interval window (e.g., between a first time interval value and a second time interval value) relative to the time that UE 104 received the one or more reference signals for which the mixed beam information report was generated.

In some aspects, a base station (e.g., BS 102) can configure or cause a UE (e.g., UE 104) to switch between different types of mixed beam reports. For example, UE 104 can switch between using a single mixed beam report (e.g., such as those described herein, wherein HARQ feedback information is included in combination with mixed beam information) and using separate reports for beam information and HARQ feedback information (e.g., a first report indicative of beam information and a a second report indicative of HARQ feedback information).

In some examples, UE 104 can dynamically switch between sending beam information and HARQ feedback information in a single report or sending beam information and HARQ feedback information in two separate reports. For example, UE 104 can dynamically switch between a single mixed beam report and two separate reports based on switching information signaled to UE 104 by BS 102. In some cases, the switching information can be signaled in, included in, or otherwise indicated based on the configuration information 910 illustrated in FIG. 9. For example, UE 104 can dynamically switch between using a single mixed beam report or two separate reports based on reporting settings information included in configuration information 910 (e.g., as also described above). In some aspects, UE 104 can determine whether to use a single mixed beam report or two separate reports based on one or more DCIs (e.g., scheduling PDSCHs associated with DMRSs), wherein the one or more DCIs may include report type switching information determined by BS 102.

In some aspects, UE 104 can determine whether to use a single mixed beam report or two separate reports based on a pre-determined time threshold. In some examples, the pre-determined time threshold can be configured and/or signaled by BS 102. For example, BS 102 can include one or more pre-determined time thresholds in the configuration information 910 that BS 102 transmits to UE 104. In some cases, BS 102 can dynamically or semi-statically configure UE 104 with the one or more pre-determined time thresholds. In some examples, the pre-determined time threshold(s) can be indicative of a maximum scheduling delay with which UE 104 is permitted to use (e.g., permitted to transmit) a single mixed beam report. The maximum scheduling delay indicated by the pre-determined time threshold can be determined relative to a time at which UE 104 received the one or more reference signals 930 (e.g., the time at which the UE received the reference signals for which the single mixed beam report would be generated).

For example, UE 104 can determine a time interval between a first time (e.g., when UE 104 received one or more reference signals) and a second time (e.g., when UE 104 would be able to transmit a single mixed beam report in response). In some cases, UE 104 can determine the time interval prior to or before the second time (e.g., UE 104 can determine the time interval before UE 104 has transmitted the single mixed beam report). In one illustrative example, UE 104 can compare the determined time interval to the pre-determined time threshold. Based on the time interval being less than the threshold, UE 104 can proceed with transmitting the single mixed beam report (e.g., at the future, second time). Based on the time interval being greater than the threshold, UE 104 can fall back to transmitting beam information and HARQ feedback information in two separate reports.

In some aspects, when UE 104 determines that the time interval is greater than the threshold (e.g., determines that transmitting a single mixed beam report would introduce a scheduling delay that exceeds the pre-determined threshold), UE 104 may transmit a separate HARQ feedback information report and a separate beam information report. In some examples, UE 104 can transmit at least the separate HARQ feedback information report prior to the second time (e.g., UE 104 can transmit HARQ feedback information in a separate report at a time that is earlier than the time at which UE 104 would have transmitted the HARQ feedback information if a single mixed beam report had been used).

Figure 13:
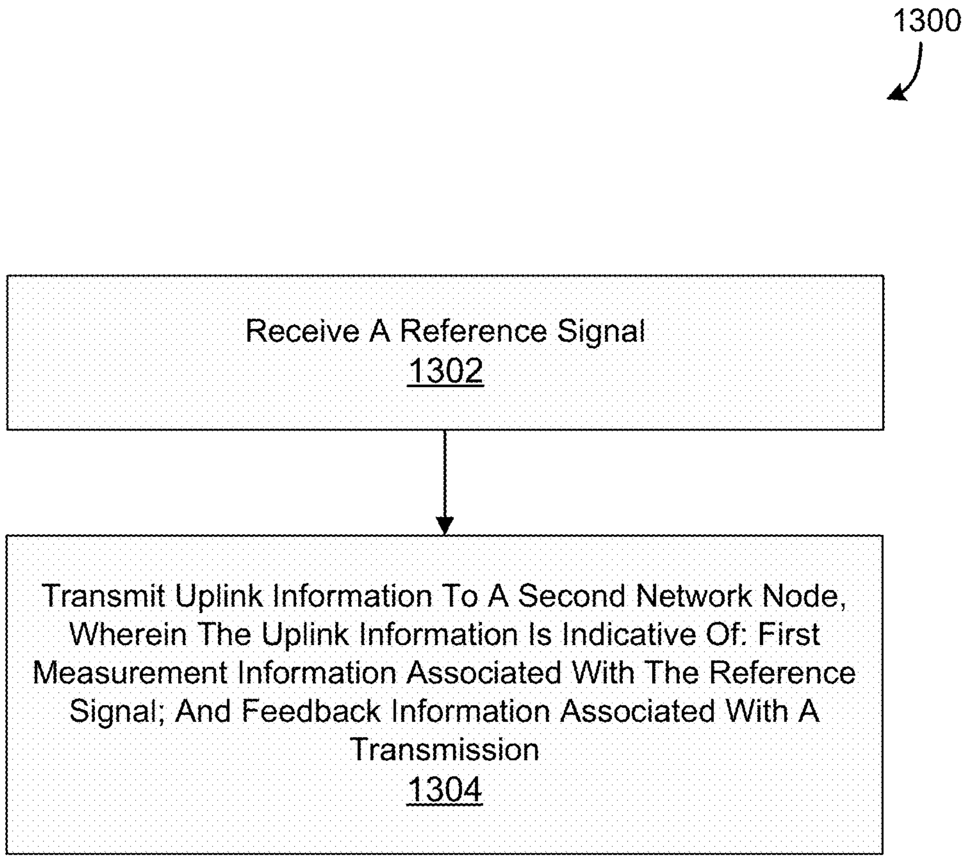
FIG. 13 is a flow diagram illustrating an example of a process for wireless communications, in accordance with some examples.

FIG. 13 is a flowchart diagram illustrating an example of a process 1300 for wireless communications. The process 1300 may be performed by a first network node or by a component or system (e.g., a chipset) of the first network node. The first network node may be a UE (e.g., a mobile device such as a mobile phone, a network-connected wearable such as a watch, an extended reality device such as a virtual reality (VR) device or augmented reality (AR) device, a vehicle or component or system of a vehicle, or other type of UE) or other type of network node. The operations of the process 1300 may be implemented as software components that are executed and run on one or more processors (e.g., processor 1510 of FIG. 15 or other processor(s)). Further, the transmission and reception of signals by the wireless communications device in the process 1300 may be enabled, for example, by one or more antennas and/or one or more transceivers (e.g., antenna(s) and/or wireless transceiver(s) of any of FIG. 2, FIG. 4, FIG. 15, etc.).

At block 1302, the first network node (or component thereof) may receive a reference signal. In some examples, the reference signal may include one or more of a synchronization signal block (SSB), a channel state information (CSI) reference signal (CSI-RS), a demodulation reference signal (DMRS), a positioning reference signal (PRS), a phase tracking reference signal (PTRS), or other reference signal.

At block 1304, the first network node (or component thereof) may cause uplink information to be transmitted to a second network node. In some cases, the second network node may include a base station (e.g., a gNB, an eNB, or other base station), a portion of the base station (e.g., a CU, DU, RU, RIC, or other portion of a base station having a disaggregated architecture), or other type of network node. The uplink information is indicative of first measurement information associated with the reference signal and feedback information associated with a transmission. In some cases, the first measurement information is first reference signal received power (RSRP) information or first signal-to-interference-plus-noise ratio (SINR) information. In some aspects, the feedback information is Hybrid Automatic Repeat Request (HARQ) feedback information. In some cases, the transmission with which the feedback information is associated is a PDSCH transmission. In some cases, the uplink information is a measurement report. The first network node (or component thereof) may transmit the uplink information using a Physical Uplink Shared Channel (PUSCH), a Physical Uplink Communication Channel (PUCCH), a Physical Sidelink Shared Channel (PSSCH), and/or other channel.

In some aspects, the uplink information includes first information indicative of the first measurement information and second information indicative of the feedback information. For instance, the first information may be the first RSRP information or the first SINR information, and the second information may be one or more bits. An illustrative example of such aspects is described above with respect to FIG. 10 (e.g., with explicitly signaled HARQ feedback information 1080).

In some aspects, the uplink information includes first information indicative of the first measurement information and the feedback information. An illustrative example of such aspects is described above with respect to FIG. 11 (e.g., with implicitly signaled HARQ feedback information 1180).

In some cases, the first network node (or component thereof) may receive a second reference signal, where the second reference signal and the reference signal are of a same type. In such cases, the uplink information may further include second information indicative of second measurement information associated with the second reference signal of the same type. For instance, the first measurement information may be first RSRP information or first SINR information, and the second measurement information may be second RSRP information or second SINR information.

In some aspects, the second information is a differential value relative to the first information. In other aspects, the first information is a single value. In one illustrative example, the first measurement information is a measurement value and the feedback information is an acknowledgement, and the single value is indicative of the acknowledgement (e.g., as described with respect to FIG. 10). In another illustrative example, the feedback information is an acknowledgement, and the acknowledgement is implicit based on the single value (e.g., as described with respect to FIG. 11). In another illustrative example, the feedback information is an acknowledgement, and the single value is indicative of the first measurement information relative to a threshold (e.g., as described with respect to FIG. 12). In such an example, the single value may include one or more bits (e.g., two bits as shown in FIG. 12). The first network node (or component thereof) may receive information indicative of the threshold from the second network node. In some cases, the single value is a first value or a second value, where the first value is indicative that the first measurement information is greater than the threshold and the second value is indicative that the first measurement information is less than the threshold (e.g., as described with respect to FIG. 12).

In another illustrative example, the feedback information is a negative acknowledgement, and the single value is indicative of the first measurement information relative to a threshold. In such an example, the single value may be one or more bits. Additionally or alternatively, the single value may be a first value or a second value, where the first value is indicative that the first measurement information is greater than the threshold and the second value is indicative that the first measurement information is less than the threshold (e.g., as described with respect to FIG. 12).

In some aspects, the first network node (or component thereof) may transmit the uplink information based on a time offset. For instance, as described herein, the time offset may be based on a capability associated with the first network node, a report type associated with the uplink information, a Sub-Carrier Spacing (SCS), any combination thereof, and/or other information. In some examples, the first network node (or component thereof) may transmit the uplink information based on the time offset being less than a time threshold. In some cases, the first network node (or component thereof) may receive information indicative of the time threshold from the second network node.

Figure 14:
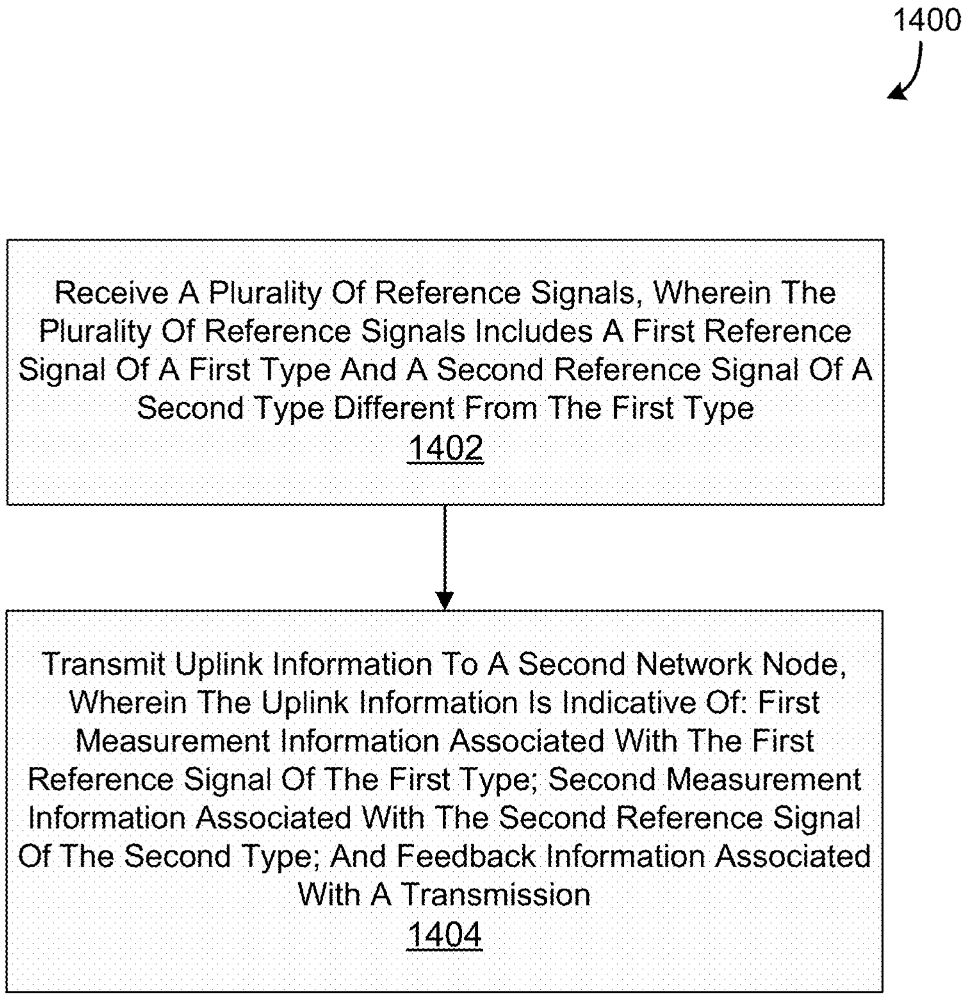
FIG. 14 is a flow diagram illustrating another example of a process for wireless communications, in accordance with some examples.

FIG. 14 is a flowchart diagram illustrating another example of a process 1400 for wireless communications.

The process 1400 may be performed by a first network node or by a component or system (e.g., a chipset) of the first network node. The first network node may be a base station (e.g., a gNB, an eNB, or other base station), a portion of the base station (e.g., a CU, DU, RU, RIC, or other portion of a base station having a disaggregated architecture) or other type of network node. The operations of the process 1400 may be implemented as software components that are executed and run on one or more processors (e.g., processor 1510 of FIG. 15 or other processor(s)). Further, the transmission and reception of signals by the wireless communications device in the process 1400 may be enabled, for example, by one or more antennas and/or one or more transceivers (e.g., antenna(s) and/or wireless transceiver(s) of any of FIG. 2, FIG. 4, FIG. 15, etc.).

At block 1402, the first network node (or component thereof) may receive a plurality of reference signals. The plurality of reference signals include a first reference signal of a first type and a second reference signal of a second type different from the first type. In some examples, the plurality of reference signals (including the first and second reference signals) may include one or more of a synchronization signal block (SSB), a channel state information (CSI) reference signal (CSI-RS), a demodulation reference signal (DMRS), a positioning reference signal (PRS), a phase tracking reference signal (PTRS), or other reference signal.

At block 1404, the first network node (or component thereof) may cause uplink information to be transmitted to a second network node. The second network node may include a UE (e.g., a mobile device such as a mobile phone, a network-connected wearable such as a watch, an extended reality device such as a virtual reality (VR) device or augmented reality (AR) device, a vehicle or component or system of a vehicle, or other type of UE).

The uplink information is indicative of first measurement information associated with the first reference signal of the first type, second measurement information associated with the second reference signal of the second type, and feedback information associated with a transmission. In some cases, the first measurement information is first reference signal received power (RSRP) information or first signal-to-interference-plus-noise ratio (SINR) information, and the second measurement information is second RSRP information or second SINR information. In some aspects, the feedback information is Hybrid Automatic Repeat Request (HARQ) feedback information. In some cases, the transmission with which the feedback information is associated is a PDSCH transmission. The first network node (or component thereof) may transmit the uplink information using a PUSCH, a PUCCH, a PSSCH, and/or other channel. In some aspects, the first network node (or component thereof) may generate measurement information based on the plurality of reference signals, and wherein the measurement information includes the first measurement information and the second measurement information In some cases, the uplink information is a measurement report.

In some aspects, the uplink information includes first information indicative of the first measurement information, second information indicative of the second measurement information, and third information indicative of the feedback information. An illustrative example of such aspects is described above with respect to FIG. 10 (e.g., with explicitly signaled HARQ feedback information 1080). For instance, the second information may be a differential value relative to the first information, and the third information is one or more bits. In some examples, the first information may include the first RSRP information or the first SINR information, and the second information may include the second RSRP information or the second SINR information.

In some aspects, the uplink information includes first information indicative of the first measurement information and the feedback information and second information indicative of the second measurement information. An illustrative example of such aspects is described above with respect to FIG. 11 (e.g., with implicitly signaled HARQ feedback information 1180). For example, the second information may include a differential value relative to the first information. Similar to the prior example, the first information may include the first RSRP information or the first SINR information, and the second information may be the second RSRP information or the second SINR information.

In some aspects, the plurality of reference signals further includes a third reference signal of the first type, and the uplink information further includes third information indicative of third measurement information associated with the third reference signal of the first type. In such aspects, the third information may include a differential value relative to the first information.

In some aspects, the first information is a single value. In one illustrative example, the first measurement information is a measurement value and the feedback information is an acknowledgement, in which case the single value is indicative of the acknowledgement (e.g., as described with respect to FIG. 10). In another illustrative example, the feedback information is an acknowledgement, and the acknowledgement is implicit based on the single value (e.g., as described with respect to FIG. 11). In another illustrative example, the feedback information is an acknowledgement, and the single value is indicative of the first measurement information relative to a threshold (e.g., as described with respect to FIG. 12). In such an example, the single value may include one or more bits (e.g., two bits as shown in FIG. 12). The first network node (or component thereof) may receive information indicative of the threshold from the second network node. In some cases, the single value is a first value or a second value, where the first value is indicative that the first measurement information (e.g., first RSRP information or first SINR information) is greater than the threshold and the second value is indicative that the first measurement information is less than the threshold (e.g., as described with respect to FIG. 12).

In another illustrative example, the feedback information is a negative acknowledgement, and the single value is indicative of the first measurement information relative to a threshold. In such an example, the single value may be one or more bits. Additionally or alternatively, the single value may be a first value or a second value, where the first value is indicative that the first measurement information is greater than the threshold and the second value is indicative that the first measurement information is less than the threshold (e.g., as described with respect to FIG. 12).

In some aspects, the first network node (or component thereof) may transmit the uplink information based on a time offset. For instance, as described herein, the time offset may be based on a capability associated with the first network node, a report type associated with the uplink information, a Sub-Carrier Spacing (SCS), any combination thereof, and/or other information. In some examples, the first network node (or component thereof) may transmit the uplink information based on the time offset being less than a time threshold. In some cases, the first network node (or component thereof) may receive information indicative of the time threshold from the second network node.

In some examples, the processes described herein (e.g., process 1300, process 1400, and/or other process described herein) may be performed by a computing device or apparatus (e.g., a network node such as a UE, base station, a portion of a base station, etc.). For instance, as noted above, the process 1300 may be performed by a UE and the process 1400 may be performed by a base station or a portion of a base station. In another example, the process 1300 and/or the process 1400 may be performed by a computing device with the computing system 1500 shown in FIG. 15. For instance, a wireless communication device with the computing architecture shown in FIG. 15 may include the components of the UE and may implement the operations of FIG. 13 and/or FIG. 14.

In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, one or more network interfaces configured to communicate and/or receive the data, any combination thereof, and/or other component(s). The one or more network interfaces may be configured to communicate and/or receive wired and/or wireless data, including data according to the 3G, 4G, 5G, and/or other cellular standard, data according to the WiFi (802.11x) standards, data according to the Bluetooth™ standard, data according to the Internet Protocol (IP) standard, and/or other types of data.

The components of the computing device may be implemented in circuitry. For example, the components may include and/or may be implemented using electronic circuits or other electronic hardware, which may include one or more programmable electronic circuits (e.g., microprocessors, graphics processing units (GPUs), digital signal processors (DSPs), central processing units (CPUs), and/or other suitable electronic circuits), and/or may include and/or be implemented using computer software, firmware, or any combination thereof, to perform the various operations described herein.

The process 1300 and the process 1400 are illustrated as a logical flow diagrams, the operation of which represent a sequence of operations that may be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations may be combined in any order and/or in parallel to implement the processes.

Additionally, the process 1300, the process 1400, and/or other process described herein, may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 15:
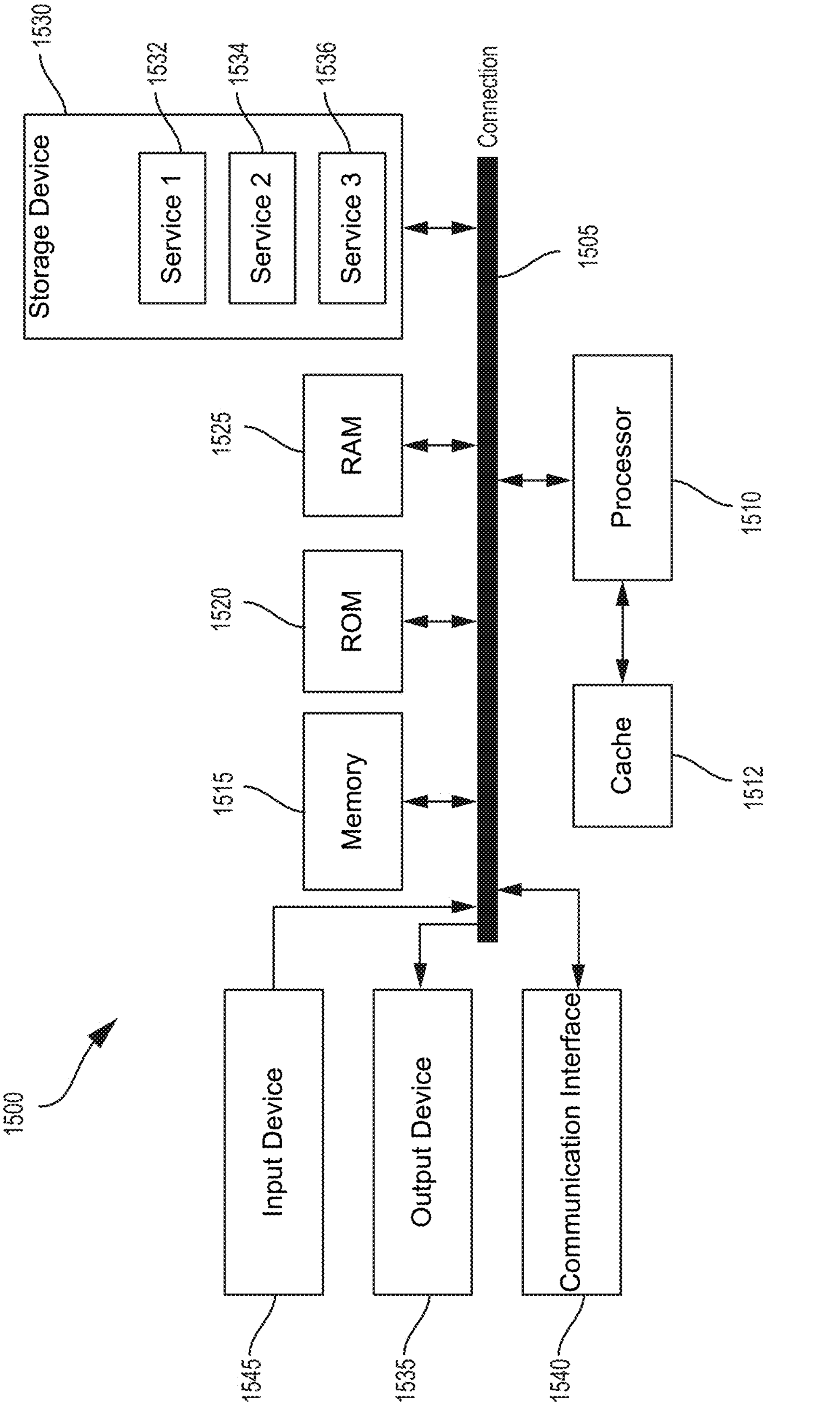
FIG. 15 is a block diagram illustrating an example of a computing system, in accordance with some examples.

FIG. 15 is a diagram illustrating an example of a system for implementing certain aspects of the present technology. In particular, FIG. 15 illustrates an example of computing system 1500, which may be for example any computing device making up internal computing system, a remote computing system, a camera, or any component thereof in which the components of the system are in communication with each other using connection 1505. Connection 1505 may be a physical connection using a bus, or a direct connection into processor 1510, such as in a chipset architecture. Connection 1505 may also be a virtual connection, networked connection, or logical connection.

In some aspects, computing system 1500 is a distributed system in which the functions described in this disclosure may be distributed within a datacenter, multiple data centers, a peer network, etc. In some aspects, one or more of the described system components represents many such components each performing some or all of the function for which the component is described. In some aspects, the components may be physical or virtual devices.

Example system 1500 includes at least one processing unit (CPU or processor) 1510 and connection 1505 that communicatively couples various system components including system memory 1515, such as read-only memory (ROM) 1520 and random access memory (RAM) 1525 to processor 1510. Computing system 1500 may include a cache 1515 of high-speed memory connected directly with, in close proximity to, or integrated as part of processor 1510.

Processor 1510 may include any general-purpose processor and a hardware service or software service, such as services 1532, 1534, and 1536 stored in storage device 1530, configured to control processor 1510 as well as a special-purpose processor where software instructions are incorporated into the actual processor design. Processor 1510 may essentially be a completely self-contained computing system, containing multiple cores or processors, a bus, memory controller, cache, etc. A multi-core processor may be symmetric or asymmetric.

To enable user interaction, computing system 1500 includes an input device 1545, which may represent any number of input mechanisms, such as a microphone for speech, a touch-sensitive screen for gesture or graphical input, keyboard, mouse, motion input, speech, etc. Computing system 1500 may also include output device 1535, which may be one or more of a number of output mechanisms. In some instances, multimodal systems may enable a user to provide multiple types of input/output to communicate with computing system 1500.

Computing system 1500 may include communications interface 1540, which may generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple™ Lightning™ port/plug, an Ethernet port/plug, a fiber optic port/plug, a proprietary wired port/plug, 3G, 4G, 5G and/or other cellular data network wireless signal transfer, a Bluetooth™ wireless signal transfer, a Bluetooth™ low energy (BLE) wireless signal transfer, an IBEACON™ wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 1540 may also include one or more Global Navigation Satellite System (GNSS) receivers or transceivers that are used to determine a location of the computing system 1500 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 1530 may be a non-volatile and/or non-transitory and/or computer-readable memory device and may be a hard disk or other types of computer readable media which may store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (e.g., Level 1 (L1) cache, Level 2 (L2) cache, Level 3 (L3) cache, Level 4 (L4) cache, Level 5 (L5) cache, or other (L #) cache), resistive random-access memory (RRAM/ReRAM), phase change memory (PCM), spin transfer torque RAM (STT-RAM), another memory chip or cartridge, and/or a combination thereof.

The storage device 1530 may include software services, servers, services, etc., that when the code that defines such software is executed by the processor 1510, it causes the system to perform a function. In some aspects, a hardware service that performs a particular function may include the software component stored in a computer-readable medium in connection with the necessary hardware components, such as processor 1510, connection 1505, output device 1535, etc., to carry out the function. The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data may be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, or the like.

Specific details are provided in the description above to provide a thorough understanding of the aspects and examples provided herein, but those skilled in the art will recognize that the application is not limited thereto. Thus, while illustrative aspects of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, aspects may be utilized in any number of environments and applications beyond those described herein without departing from the broader scope of the specification. The specification and drawings are, accordingly, to be regarded as illustrative rather than restrictive. For the purposes of illustration, methods were described in a particular order. It should be appreciated that in alternate aspects, the methods may be performed in a different order than that described.

For clarity of explanation, in some instances the present technology may be presented as including individual functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Individual aspects may be described above as a process or method which is depicted as a flowchart, a flow diagram, a data flow diagram, a structure diagram, or a block diagram. Although a flowchart may describe the operations as a sequential process, many of the operations may be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination may correspond to a return of the function to the calling function or the main function.

Processes and methods according to the above-described examples may be implemented using computer-executable instructions that are stored or otherwise available from computer-readable media. Such instructions may include, for example, instructions and data which cause or otherwise configure a general purpose computer, special purpose computer, or a processing device to perform a certain function or group of functions. Portions of computer resources used may be accessible over a network. The computer executable instructions may be, for example, binaries, intermediate format instructions such as assembly language, firmware, source code. Examples of computer-readable media that may be used to store instructions, information used, and/or information created during methods according to described examples include magnetic or optical disks, flash memory, USB devices provided with non-volatile memory, networked storage devices, and so on.

In some aspects the computer-readable storage devices, mediums, and memories may include a cable or wireless signal containing a bitstream and the like. However, when mentioned, non-transitory computer-readable storage media expressly exclude media such as energy, carrier signals, electromagnetic waves, and signals per se.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof, in some cases depending in part on the particular application, in part on the desired design, in part on the corresponding technology, etc.

The various illustrative logical blocks, modules, and circuits described in connection with the aspects disclosed herein may be implemented or performed using hardware, software, firmware, middleware, microcode, hardware description languages, or any combination thereof, and may take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Examples of form factors include laptops, smart phones, mobile phones, tablet devices or other small form factor personal computers, personal digital assistants, rackmount devices, standalone devices, and so on. Functionality described herein also may be embodied in peripherals or add-in cards. Such functionality may also be implemented on a circuit board among different chips or different processes executing in a single device, by way of further example.

The instructions, media for conveying such instructions, computing resources for executing them, and other structures for supporting such computing resources are example means for providing the functions described in the disclosure.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods, algorithms, and/or operations described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that may be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general-purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

One of ordinary skill will appreciate that the less than ("<") and greater than (">") symbols or terminology used herein may be replaced with less than or equal to ("≤") and greater than or equal to ("≥") symbols, respectively, without departing from the scope of this description.

Where components are described as being "configured to" perform certain operations, such configuration may be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" or "communicatively coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, A and B and C, or any duplicate information or data (e.g., A and A, B and B, C and C, A and A and B, and so on), or any other ordering, duplication, or combination of A, B, and C. The language "at least one of" a set and/or "one or more" of a set does not limit the set to the items listed in the set. For example, claim language reciting "at least one of A and B" or "at least one of A or B" may mean A, B, or A and B, and may additionally include items not listed in the set of A and B.

Illustrative aspects of the disclosure include:

Aspect 1. A first network node for wireless communication, comprising: at least one memory; and at least one processor coupled to the at least one memory, the at least one processor configured to: receive a reference signal; and cause uplink information to be transmitted to a second network node, wherein the uplink information is indicative of: first measurement information associated with the reference signal; and feedback information associated with a transmission.

Aspect 2. The first network node of Aspect 1, wherein the uplink information includes: first information indicative of the first measurement information; and second information indicative of the feedback information.

Aspect 3. The first network node of Aspect 2, wherein the first information is first reference signal received power (RSRP) information or first signal-to-interference-plus-noise ratio (SINR) information, and the second information is one or more bits.

Aspect 4. The first network node of any of Aspects 1 to 3, wherein the uplink information includes first information indicative of the first measurement information and the feedback information.

Aspect 5. The first network node of Aspect 4, wherein the at least one processor is configured to receive a second reference signal, wherein the second reference signal and the reference signal are of a same type, and wherein the uplink information further includes second information indicative of second measurement information associated with the second reference signal of the same type.

Aspect 6. The first network node of Aspect 5, wherein the second information is a differential value relative to the first information.

Aspect 7. The first network node of any of Aspects 5 or 6, wherein the first information is a single value.

Aspect 8. The first network node of Aspect 7, wherein the first measurement information is a measurement value and the feedback information is an acknowledgement, and wherein the single value is indicative of the acknowledgement.

Aspect 9. The first network node of Aspect 7, wherein the feedback information is an acknowledgement, and wherein the acknowledgement is implicit based on the single value.

Aspect 10. The first network node of Aspect 7, wherein the feedback information is an acknowledgement, and wherein the single value is indicative of the first measurement information relative to a threshold.

Aspect 11. The first network node of Aspect 10, wherein the single value is one or more bits.

Aspect 12. The first network node of any of Aspects 10 or 11, wherein the at least one processor is configured to receive information indicative of the threshold from the second network node.

Aspect 13. The first network node of Aspect 10, wherein the single value is a first value or a second value, wherein: the first value is indicative that the first measurement information is greater than the threshold; and the second value is indicative that the first measurement information is less than the threshold.

Aspect 14. The first network node of Aspect 13, wherein the first measurement information is first reference signal received power (RSRP) information or first signal-to-interference-plus-noise ratio (SINR) information, and the second measurement information is second RSRP information or second SINR information.

Aspect 15. The first network node of Aspect 7, wherein the feedback information is a negative acknowledgement, and wherein the single value is indicative of the first measurement information relative to a threshold.

Aspect 16. The first network node of Aspect 15, wherein the single value is one or more bits.

Aspect 17. The first network node of Aspect 15, wherein the single value is a first value or a second value, and wherein: the first value is indicative that the first measurement information is greater than the threshold; and the second value is indicative that the first measurement information is less than the threshold.

Aspect 18. The first network node of any of Aspects 1 to 17, wherein the feedback information is Hybrid Automatic Repeat Request (HARQ) feedback information.

Aspect 19. The first network node of any of Aspects 1 to 18, wherein the transmission is a PDSCH transmission.

Aspect 20. The first network node of any of Aspects 1 to 19, wherein the uplink information is a measurement report.

Aspect 21. The first network node of any of Aspects 1 to 20, wherein: the first network node is a User Equipment (UE); and the second network node is one of a base station, a next generation node B (gNB), or an evolved node B (eNB).

Aspect 22. The first network node of any of Aspects 1 to 21, wherein the at least one processor is configured to cause the uplink information to be transmitted based on a time offset.

Aspect 23. The first network node of Aspect 22, wherein the time offset is based on one or more of a capability associated with the first network node, a report type associated with the uplink information, and a Sub-Carrier Spacing (SCS).

Aspect 24. The first network node of any of Aspects 22 or 23, wherein the at least one processor is configured to cause the uplink information to be transmitted based on the time offset being less than a time threshold.

Aspect 25. The first network node of Aspect 24, wherein the at least one processor is configured to receive information indicative of the time threshold from the second network node.

Aspect 26. The first network node of any of Aspects 1 to 25, wherein the at least one processor is configured to cause the uplink information to be transmitted using a Physical Uplink Shared Channel (PUSCH) or a Physical Uplink Communication Channel (PUCCH).

Aspect 27. The first network node of any of Aspects 1 to 26, wherein the at least one processor is configured to cause the uplink information to be transmitted using a Physical Sidelink Shared Channel (PSSCH).

Aspect 28. A method for wireless communication at a first network node, the method comprising: receiving a reference signal; and transmitting uplink information to a second network node, wherein the uplink information is indicative of: first measurement information associated with the reference signal; and feedback information associated with a transmission.

Aspect 29. The method of Aspect 28, wherein the uplink information includes: first information indicative of the first measurement information; and second information indicative of the feedback information.

Aspect 30. The method of Aspect 29, wherein the first information is first reference signal received power (RSRP) information or first signal-to-interference-plus-noise ratio (SINR) information, and the second information is one or more bits.

Aspect 31. The method of any of Aspects 28 to 30, wherein the uplink information includes first information indicative of the first measurement information and the feedback information.

Aspect 32. The method of Aspect 31, further comprising receiving a second reference signal, wherein the second reference signal and the reference signal are of a same type, and wherein the uplink information further includes second information indicative of second measurement information associated with the second reference signal of the same type.

Aspect 33. The method of Aspect 32, wherein the second information is a differential value relative to the first information.

Aspect 34. The method of any of Aspects 32 or 33, wherein the first information is a single value.

Aspect 35. The method of Aspect 34, wherein the first measurement information is a measurement value and the feedback information is an acknowledgement, and wherein the single value is indicative of the acknowledgement.

Aspect 36. The method of Aspect 34, wherein the feedback information is an acknowledgement, and wherein the acknowledgement is implicit based on the single value.

Aspect 37. The method of Aspect 34, wherein the feedback information is an acknowledgement, and wherein the single value is indicative of the first measurement information relative to a threshold.

Aspect 38. The method of Aspect 37, wherein the single value is one or more bits.

Aspect 39. The method of any of Aspects 37 or 38, further comprising receiving information indicative of the threshold from the second network node.

Aspect 40. The method of Aspect 37, wherein the single value is a first value or a second value, wherein: the first value is indicative that the first measurement information is greater than the threshold; and the second value is indicative that the first measurement information is less than the threshold.

Aspect 41. The method of Aspect 40, wherein the first measurement information is first reference signal received power (RSRP) information or first signal-to-interference-plus-noise ratio (SINR) information, and the second measurement information is second RSRP information or second SINR information.

Aspect 42. The method of Aspect 34, wherein the feedback information is a negative acknowledgement, and wherein the single value is indicative of the first measurement information relative to a threshold.

Aspect 43. The method of Aspect 42, wherein the single value is one or more bits.

Aspect 44. The method of Aspect 42, wherein the single value is a first value or a second value, and wherein: the first value is indicative that the first measurement information is greater than the threshold; and the second value is indicative that the first measurement information is less than the threshold.

Aspect 45. The method of any of Aspects 28 to 44, wherein the feedback information is Hybrid Automatic Repeat Request (HARQ) feedback information.

Aspect 46. The method of any of Aspects 28 to 45, wherein the transmission is a PDSCH transmission.

Aspect 47. The method of any of Aspects 28 to 46, wherein the uplink information is a measurement report.

Aspect 48. The method of any of Aspects 28 to 47, wherein: the first network node is a User Equipment (UE); and the second network node is one of a base station, a next generation node B (gNB), or an evolved node B (eNB).

Aspect 49. The method of any of Aspects 28 to 48, wherein the uplink information is transmitted based on a time offset.

Aspect 50. The method of Aspect 49, wherein the time offset is based on one or more of a capability associated with the first network node, a report type associated with the uplink information, and a Sub-Carrier Spacing (SCS).

Aspect 51. The method of any of Aspects 49 or 50, wherein the uplink information is transmitted based on the time offset being less than a time threshold.

Aspect 52. The method of Aspect 51, further comprising receiving information indicative of the time threshold from the second network node.

Aspect 53. The method of any of Aspects 28 to 52, wherein the uplink information is transmitted using a Physical Uplink Shared Channel (PUSCH) or a Physical Uplink Communication Channel (PUCCH).

Aspect 54. The method of any of Aspects 28 to 53, wherein the uplink information is transmitted using a Physical Sidelink Shared Channel (PSSCH).

Aspect 55. A first network node for wireless communication, comprising: at least one memory; and at least one processor coupled to the at least one memory, the at least one processor configured to: receive a plurality of reference signals, wherein the plurality of reference signals includes a first reference signal of a first type and a second reference signal of a second type different from the first type; and cause uplink information to be transmitted to a second network node, wherein the uplink information is indicative of: first measurement information associated with the first reference signal of the first type; second measurement information associated with the second reference signal of the second type; and feedback information associated with a transmission.

Aspect 56. The first network node of Aspect 55, wherein the uplink information includes: first information indicative of the first measurement information; second information indicative of the second measurement information; and third information indicative of the feedback information.

Aspect 57. The first network node of Aspect 56, wherein the second information is a differential value relative to the first information, and wherein the third information is one or more bits.

Aspect 58. The first network node of any of Aspects 56 or 57, wherein the first information is first reference signal received power (RSRP) information or first signal-to-interference-plus-noise ratio (SINR) information, and the second information is second RSRP information or second SINR information.

Aspect 59. The first network node of Aspect 55, wherein the uplink information includes: first information indicative of the first measurement information and the feedback information; and second information indicative of the second measurement information.

Aspect 60. The first network node of Aspect 59, wherein the second information is a differential value relative to the first information.

Aspect 61. The first network node of any of Aspects 59 or 60, wherein the first information is first reference signal received power (RSRP) information or first signal-to-interference-plus-noise ratio (SINR) information, and the second information is second RSRP information or second SINR information.

Aspect 62. The first network node of any of Aspects 55 to 61, wherein the plurality of reference signals further includes a third reference signal of the first type, and wherein the uplink information further includes third information indicative of third measurement information associated with the third reference signal of the first type.

Aspect 63. The first network node of Aspect 62, wherein the third information is a differential value relative to the first information.

Aspect 64. The first network node of Aspect 59, wherein the first information is a single value.

Aspect 65. The first network node of Aspect 64, wherein the first measurement information is a measurement value and the feedback information is an acknowledgement, and wherein the single value is indicative of the acknowledgement.

Aspect 66. The first network node of Aspect 64, wherein the feedback information is an acknowledgement, and wherein the acknowledgement is implicit based on the single value.

Aspect 67. The first network node of Aspect 64, wherein the feedback information is an acknowledgement, and wherein the single value is indicative of the first measurement information relative to a threshold.

Aspect 68. The first network node of Aspect 67, wherein the single value is one or more bits.

Aspect 69. The first network node of any of Aspects 67 or 68, wherein the at least one processor is configured to receive information indicative of the threshold from the second network node.

Aspect 70. The first network node of Aspect 67, wherein the single value is a first value or a second value, wherein: the first value is indicative that the first measurement information is greater than the threshold; and the second value is indicative that the first measurement information is less than the threshold.

Aspect 71. The first network node of Aspect 70, wherein the first measurement information is first reference signal received power (RSRP) information or first signal-to-interference-plus-noise ratio (SINR) information, and the second measurement information is second RSRP information or second SINR information.

Aspect 72. The first network node of Aspect 64, wherein the feedback information is a negative acknowledgement, and wherein the single value is indicative of the first measurement information relative to a threshold.

Aspect 73. The first network node of Aspect 72, wherein the single value is one or more bits.

Aspect 74. The first network node of Aspect 72, wherein the single value is a first value or a second value, wherein: the first value is indicative that the first measurement information is greater than the threshold; and the second value is indicative that the first measurement information is less than the threshold.

Aspect 75. The first network node of any of Aspects 55 to 74, wherein the feedback information is Hybrid Automatic Repeat Request (HARQ) feedback information.

Aspect 76. The first network node of any of Aspects 55 to 75, wherein the transmission is a PDSCH transmission.

Aspect 77. The first network node of any of Aspects 55 to 76, wherein the at least one processor is configured to generate measurement information based on the plurality of reference signals, and wherein the measurement information includes the first measurement information and the second measurement information.

Aspect 78. The first network node of any of Aspects 55 to 77, wherein the uplink information is a measurement report.

Aspect 79. The first network node of any of Aspects 55 to 78, wherein: the first network node is a User Equipment (UE); and the second network node is one of a base station, a next generation node B (gNB), or an evolved node B (eNB).

Aspect 80. The first network node of any of Aspects 55 to 79, wherein the at least one processor is configured to cause the uplink information to be transmitted based on a time offset.

Aspect 81. The first network node of Aspect 80, wherein the time offset is based on one or more of a capability associated with the first network node, a report type associated with the uplink information, and a Sub-Carrier Spacing (SCS).

Aspect 82. The first network node of any of Aspects 80 or 81, wherein the at least one processor is configured to: cause the uplink information to be transmitted based on the time offset being less than a time threshold.

Aspect 83. The first network node of Aspect 82, wherein the at least one processor is configured to receive information indicative of the time threshold from the second network node.

Aspect 84. The first network node of any of Aspects 55 to 83, wherein the at least one processor is configured to cause the uplink information to be transmitted using a Physical Uplink Shared Channel (PUSCH) or a Physical Uplink Communication Channel (PUCCH).

Aspect 85. The first network node of any of Aspects 55 to 84, wherein the at least one processor is configured to cause the uplink information to be transmitted using a Physical Sidelink Shared Channel (PSSCH).

Aspect 86. A method for wireless communication at a first network node, the method comprising: receiving a plurality of reference signals, wherein the plurality of reference signals includes a first reference signal of a first type and a second reference signal of a second type different from the first type; and transmitting uplink information to a second network node, wherein the uplink information is indicative of: first measurement information associated with the first reference signal of the first type; second measurement information associated with the second reference signal of the second type; and feedback information associated with a transmission.

Aspect 87. The method of Aspect 86, wherein the uplink information includes: first information indicative of the first measurement information; second information indicative of the second measurement information; and third information indicative of the feedback information.

Aspect 88. The method of Aspect 87, wherein the second information is a differential value relative to the first information, and wherein the third information is one or more bits.

Aspect 89. The method of any of Aspects 87 or 88, wherein the first information is first reference signal received power (RSRP) information or first signal-to-interference-plus-noise ratio (SINR) information, and the second information is second RSRP information or second SINR information.

Aspect 90. The method of Aspect 86, wherein the uplink information includes: first information indicative of the first measurement information and the feedback information; and second information indicative of the second measurement information.

Aspect 91. The method of Aspect 90, wherein the second information is a differential value relative to the first information.

Aspect 92. The method of any of Aspects 90 or 91, wherein the first information is first reference signal received power (RSRP) information or first signal-to-interference-plus-noise ratio (SINR) information, and the second information is second RSRP information or second SINR information.

Aspect 93. The method of any of Aspects 86 to 92, wherein the plurality of reference signals further includes a third reference signal of the first type, and wherein the uplink information further includes third information indicative of third measurement information associated with the third reference signal of the first type.

Aspect 94. The method of Aspect 93, wherein the third information is a differential value relative to the first information.

Aspect 95. The method of Aspect 90, wherein the first information is a single value.

Aspect 96. The method of Aspect 95, wherein the first measurement information is a measurement value and the feedback information is an acknowledgement, and wherein the single value is indicative of the acknowledgement.

Aspect 97. The method of Aspect 95, wherein the feedback information is an acknowledgement, and wherein the acknowledgement is implicit based on the single value.

Aspect 98. The method of Aspect 95, wherein the feedback information is an acknowledgement, and wherein the single value is indicative of the first measurement information relative to a threshold.

Aspect 99. The method of Aspect 98, wherein the single value is one or more bits.

Aspect 100. The method of any of Aspects 98 or 99, further comprising receiving information indicative of the threshold from the second network node.

Aspect 101. The method of Aspect 98, wherein the single value is a first value or a second value, wherein: the first value is indicative that the first measurement information is greater than the threshold; and the second value is indicative that the first measurement information is less than the threshold.

Aspect 102. The method of Aspect 101, wherein the first measurement information is first reference signal received power (RSRP) information or first signal-to-interference-plus-noise ratio (SINR) information, and the second measurement information is second RSRP information or second SINR information.

Aspect 103. The method of Aspect 95, wherein the feedback information is a negative acknowledgement, and wherein the single value is indicative of the first measurement information relative to a threshold.

Aspect 104. The method of Aspect 103, wherein the single value is one or more bits.

Aspect 105. The method of Aspect 103, wherein the single value is a first value or a second value, wherein: the first value is indicative that the first measurement information is greater than the threshold; and the second value is indicative that the first measurement information is less than the threshold.

Aspect 106. The method of any of Aspects 86 to 105, wherein the feedback information is Hybrid Automatic Repeat Request (HARQ) feedback information.

Aspect 107. The method of any of Aspects 86 to 106, wherein the transmission is a PDSCH transmission.

Aspect 108. The method of any of Aspects 86 to 107, further comprising generating measurement information based on the plurality of reference signals, and wherein the measurement information includes the first measurement information and the second measurement information.

Aspect 109. The method of any of Aspects 86 to 108, wherein the uplink information is a measurement report.

Aspect 110. The method of any of Aspects 86 to 109, wherein: the first network node is a User Equipment (UE); and the second network node is one of a base station, a next generation node B (gNB), or an evolved node B (eNB).

Aspect 111. The method of any of Aspects 86 to 110, wherein the uplink information is transmitted based on a time offset.

Aspect 112. The method of Aspect 111, wherein the time offset is based on one or more of a capability associated with the first network node, a report type associated with the uplink information, and a Sub-Carrier Spacing (SCS).

Aspect 113. The method of any of Aspects 111 or 112, wherein the uplink information is transmitted based on the time offset being less than a time threshold.

Aspect 114. The method of Aspect 113, further comprising receiving information indicative of the time threshold from the second network node.

Aspect 115. The method of any of Aspects 86 to 114, wherein the uplink information is transmitted using a Physical Uplink Shared Channel (PUSCH) or a Physical Uplink Communication Channel (PUCCH).

Aspect 116. The method of any of Aspects 86 to 115, wherein the uplink information is transmitted using a Physical Sidelink Shared Channel (PSSCH).

Aspect 117. A non-transitory computer-readable medium having instructions thereon that, when executed by one or more processors, cause the one or more processors to perform operations according to any of Aspects 28 to 54.

Aspect 118. An apparatus for wireless communication, comprising one or more means for performing operations according to any of Aspects 86 to 116.

Aspect 119. A non-transitory computer-readable medium having instructions thereon that, when executed by one or more processors, cause the one or more processors to perform operations according to any of Aspects 86 to 116.

Aspect 120. An apparatus for wireless communication, comprising one or more means for performing operations according to any of Aspects 28 to 54.

Aspect 121. A method for wireless communication at a first network node, comprising: transmitting a reference signal to a second network node; and receiving uplink information from the second network node, wherein the uplink information is indicative of: first measurement information associated with the reference signal; and feedback information associated with a transmission.

Aspect 122. The method of Aspect 121, wherein the uplink information includes: first information indicative of the first measurement information; and second information indicative of the feedback information.

Aspect 123. The method of Aspect 122, wherein the first information is first reference signal received power (RSRP) information or first signal-to-interference-plus-noise ratio (SINR) information, and the second information is one or more bits.

Aspect 124. The method of any of Aspects 121 to 123, wherein the uplink information includes first information indicative of the first measurement information and the feedback information.

Aspect 125. The method of Aspect 124, further comprising transmitting a second reference signal, wherein the second reference signal and the reference signal are of a same type, and wherein the uplink information further includes second information indicative of second measurement information associated with the second reference signal of the same type.

Aspect 126. The method of Aspect 125, wherein the second information is a differential value relative to the first information.

Aspect 127. The method of any of Aspects 125 or 126, wherein the first information is a single value.

Aspect 128. The method of Aspect 127, wherein the first measurement information is a measurement value and the feedback information is an acknowledgement, and wherein the single value is indicative of the acknowledgement.

Aspect 129. The method of Aspect 127, wherein the feedback information is an acknowledgement, and wherein the acknowledgement is implicit based on the single value.

Aspect 130. The method of Aspect 127, wherein the feedback information is an acknowledgement, and wherein the single value is indicative of the first measurement information relative to a threshold.

Aspect 131. The method of Aspect 130, wherein the single value is one or more bits.

Aspect 132. The method of any of Aspects 130 or 131, further comprising transmitting information indicative of the threshold to the second network node.

Aspect 133. The method of Aspect 130, wherein the single value is a first value or a second value, wherein: the first value is indicative that the first measurement information is greater than the threshold; and the second value is indicative that the first measurement information is less than the threshold.

Aspect 134. The method of Aspect 133, wherein the first measurement information is first reference signal received power (RSRP) information or first signal-to-interference-plus-noise ratio (SINR) information, and the second measurement information is second RSRP information or second SINR information.

Aspect 135. The method of Aspect 127, wherein the feedback information is a negative acknowledgement, and wherein the single value is indicative of the first measurement information relative to a threshold.

Aspect 136. The method of Aspect 135, wherein the single value is one or more bits.

Aspect 137. The method of Aspect 135, wherein the single value is a first value or a second value, and wherein: the first value is indicative that the first measurement information is greater than the threshold; and the second value is indicative that the first measurement information is less than the threshold.

Aspect 138. The method of any of Aspects 121 to 137, wherein the feedback information is Hybrid Automatic Repeat Request (HARQ) feedback information.

Aspect 139. The method of any of Aspects 121 to 138, wherein the transmission is a PDSCH transmission.

Aspect 140. The method of any of Aspects 121 to 139, wherein the uplink information is a measurement report.

Aspect 141. The method of any of Aspects 121 to 140, wherein: the first network node is one of a base station, a next generation node B (gNB), or an evolved node B (eNB); and the second network node is a User Equipment (UE).

Aspect 142. The method of any of Aspects 121 to 141, wherein the uplink information is transmitted based on a time offset.

Aspect 143. The method of Aspect 142, wherein the time offset is based on one or more of a capability associated with the second network node, a report type associated with the uplink information, and a Sub-Carrier Spacing (SCS).

Aspect 144. The method of any of Aspects 142 or 143, wherein the uplink information is transmitted based on the time offset being less than a time threshold.

Aspect 145. The method of Aspect 144, further comprising transmitting information indicative of the time threshold to the second network node.

Aspect 146. The method of any of Aspects 121 to 145, wherein the uplink information is received using a Physical Uplink Shared Channel (PUSCH) or a Physical Uplink Communication Channel (PUCCH).

Aspect 147. The method of any of Aspects 121 to 146, wherein the uplink information is received using a Physical Sidelink Shared Channel (PSSCH).

Aspect 148. A method for wireless communication at a first network node, comprising: transmitting a plurality of reference signals to a second network node, wherein the plurality of reference signals includes a first reference signal of a first type and a second reference signal of a second type different from the first type; and receiving uplink information from the second network node, wherein the uplink information is indicative of: first measurement information associated with the first reference signal of the first type; second measurement information associated with the second reference signal of the second type; and feedback information associated with a transmission.

Aspect 149. The method of Aspect 148, wherein the uplink information includes: first information indicative of the first measurement information; second information indicative of the second measurement information; and third information indicative of the feedback information.

Aspect 150. The method of Aspect 149, wherein the second information is a differential value relative to the first information, and wherein the third information is one or more bits.

Aspect 151. The method of any of Aspects 149 or 150, wherein the first information is first reference signal received power (RSRP) information or first signal-to-interference-plus-noise ratio (SINR) information, and the second information is second RSRP information or second SINR information.

Aspect 152. The method of Aspect 148, wherein the uplink information includes: first information indicative of the first measurement information and the feedback information; and second information indicative of the second measurement information.

Aspect 153. The method of Aspect 152, wherein the second information is a differential value relative to the first information.

Aspect 154. The method of any of Aspects 152 or 153, wherein the first information is first reference signal received power (RSRP) information or first signal-to-interference-plus-noise ratio (SINR) information, and the second information is second RSRP information or second SINR information.

Aspect 155. The method of any of Aspects 148 to 154, wherein the plurality of reference signals further includes a third reference signal of the first type, and wherein the uplink information further includes third information indicative of third measurement information associated with the third reference signal of the first type.

Aspect 156. The method of Aspect 155, wherein the third information is a differential value relative to the first information.

Aspect 157. The method of Aspect 152, wherein the first information is a single value.

Aspect 158. The method of Aspect 157, wherein the first measurement information is a measurement value and the feedback information is an acknowledgement, and wherein the single value is indicative of the acknowledgement.

Aspect 159. The method of Aspect 157, wherein the feedback information is an acknowledgement, and wherein the acknowledgement is implicit based on the single value.

Aspect 160. The method of Aspect 157, wherein the feedback information is an acknowledgement, and wherein the single value is indicative of the first measurement information relative to a threshold.

Aspect 161. The method of Aspect 160, wherein the single value is one or more bits.

Aspect 162. The method of any of Aspects 160 or 161, further comprising transmitting information indicative of the threshold to the second network node.

Aspect 163. The method of Aspect 160, wherein the single value is a first value or a second value, wherein: the first value is indicative that the first measurement information is greater than the threshold; and the second value is indicative that the first measurement information is less than the threshold.

Aspect 164. The method of Aspect 163, wherein the first measurement information is first reference signal received power (RSRP) information or first signal-to-interference-plus-noise ratio (SINR) information, and the second measurement information is second RSRP information or second SINR information.

Aspect 165. The method of Aspect 157, wherein the feedback information is a negative acknowledgement, and wherein the single value is indicative of the first measurement information relative to a threshold.

Aspect 166. The method of Aspect 165, wherein the single value is one or more bits.

Aspect 167. The method of Aspect 165, wherein the single value is a first value or a second value, wherein: the first value is indicative that the first measurement information is greater than the threshold; and the second value is indicative that the first measurement information is less than the threshold.

Aspect 168. The method of any of Aspects 148 to 167, wherein the feedback information is Hybrid Automatic Repeat Request (HARQ) feedback information.

Aspect 169. The method of any of Aspects 148 to 168, wherein the transmission is a PDSCH transmission.

Aspect 170. The method of any of Aspects 148 to 169, wherein the uplink information is a measurement report.

Aspect 171. The method of any of Aspects 148 to 170, wherein: the first network node is one of a base station, a next generation node B (gNB), or an evolved node B (eNB); and the second network node is a User Equipment (UE).

Aspect 172. The method of any of Aspects 148 to 171, wherein the uplink information is transmitted based on a time offset.

Aspect 173. The method of Aspect 172, wherein the time offset is based on one or more of a capability associated with the second network node, a report type associated with the uplink information, and a Sub-Carrier Spacing (SCS).

Aspect 174. The method of any of Aspects 172 or 173, wherein the uplink information is transmitted based on the time offset being less than a time threshold.

Aspect 175. The method of Aspect 174, further comprising transmitting information indicative of the time threshold to the second network node.

Aspect 176. The method of any of Aspects 148 to 175, wherein the uplink information is received using a Physical Uplink Shared Channel (PUSCH) or a Physical Uplink Communication Channel (PUCCH).

Aspect 177. The method of any of Aspects 148 to 176, wherein the uplink information is received using a Physical Sidelink Shared Channel (PSSCH).

Aspect 178. A non-transitory computer-readable medium having instructions thereon that, when executed by one or more processors, cause the one or more processors to perform operations according to any of Aspects 121 to 147.

Aspect 179. An apparatus for wireless communication, comprising one or more means for performing operations according to any of Aspects 121 to 147.

Aspect 180. A non-transitory computer-readable medium having instructions thereon that, when executed by one or more processors, cause the one or more processors to perform operations according to any of Aspects 148 to 177.

Aspect 181. An apparatus for wireless communication, comprising one or more means for performing operations according to any of Aspects 148 to 177.

What is claimed is:

1. A first network node for wireless communication, comprising:

at least one memory; and at least one processor coupled to the at least one memory, the at least one processor configured to:

receive a plurality of reference signals including a demodulation reference signal (DMRS); and cause uplink information to be transmitted to a second network node, wherein the uplink information includes first information comprising a single value indicative of:

first measurement information associated with the plurality of reference signals; and feedback information associated with a physical downlink shared channel (PDSCH) transmission that is associated with the DMRS.

2. The first network node of claim 1, wherein the first information is first reference signal received power (RSRP) information or first signal-to-interference-plus-noise ratio (SINR) information.

3. The first network node of claim 1, wherein the uplink information further includes second information indicative of second measurement information associated with a second reference signal of the plurality of reference signals.

4. The first network node of claim 3, wherein the second information is a differential value relative to the first information.

5. The first network node of claim 1, wherein the first measurement information is a measurement value and the feedback information is an acknowledgement, and wherein the single value is indicative of the acknowledgement.

6. The first network node of claim 1, wherein the feedback information is an acknowledgement, and wherein the acknowledgement is implicit based on the single value.

7. The first network node of claim 1, wherein the feedback information is an acknowledgement, and wherein the single value is indicative of the first measurement information relative to a threshold.

8. The first network node of claim 7, wherein the single value is one or more bits.

9. The first network node of claim 7, wherein the at least one processor is configured to receive information indicative of the threshold from the second network node.

10. The first network node of claim 7, wherein the single value is a first value or a second value, wherein:

the first value is indicative that the first measurement information is greater than the threshold; and the second value is indicative that the first measurement information is less than the threshold.

11. The first network node of claim 10, wherein the first measurement information is first reference signal received power (RSRP) information or first signal-to-interference-plus-noise ratio (SINR) information, and the second measurement information is second RSRP information or second SINR information.

12. The first network node of claim 1, wherein the feedback information is a negative acknowledgement, and wherein the single value is indicative of the first measurement information relative to a threshold.

13. The first network node of claim 12, wherein the single value is one or more bits.

14. The first network node of claim 12, wherein the single value is a first value or a second value, and wherein:

the first value is indicative that the first measurement information is greater than the threshold; and the second value is indicative that the first measurement information is less than the threshold.

15. The first network node of claim 1, wherein the feedback information is Hybrid Automatic Repeat Request (HARQ) feedback information.

16. The first network node of claim 1, wherein the uplink information is a measurement report.

17. The first network node of claim 1, wherein:

the first network node is a User Equipment (UE); and the second network node is one of a base station, a next generation node B (gNB), or an evolved node B (eNB).

18. The first network node of claim 1, wherein the at least one processor is configured to cause the uplink information to be transmitted based on a time offset.

19. The first network node of claim 18, wherein the time offset is based on one or more of a capability associated with the first network node, a report type associated with the uplink information, and a Sub-Carrier Spacing (SCS).

20. The first network node of claim 18, wherein the at least one processor is configured to cause the uplink information to be transmitted based on the time offset being less than a time threshold.

21. The first network node of claim 20, wherein the at least one processor is configured to receive information indicative of the time threshold from the second network node.

22. The first network node of claim 1, wherein the at least one processor is configured to cause the uplink information to be transmitted using a Physical Uplink Shared Channel (PUSCH) or a Physical Uplink Communication Channel (PUCCH).

23. The first network node of claim 1, wherein the at least one processor is configured to cause the uplink information to be transmitted using a Physical Sidelink Shared Channel (PSSCH).

24. A method of wireless communication performed by a first network node, the method comprising:

receiving a plurality of reference signals including a demodulation reference signal (DMRS); and transmitting uplink information to a second network node, wherein the uplink information includes first information comprising a single value indicative of:

first measurement information associated with the plurality of reference signals; and feedback information associated with a physical downlink shared channel PDSCH) transmission that is associated with the DMRS.

25. The method of claim 24, wherein the first information is first reference signal received power (RSRP) information or first signal-to-interference-plus-noise ratio (SINR) information.

* * * * *